(12) United States Patent
Lee et al.

(10) Patent No.: US 10,764,595 B2
(45) Date of Patent: Sep. 1, 2020

(54) METHOD AND APPARATUS FOR ENCODING IMAGE BY USING ATYPICAL SPLIT, AND METHOD AND APPARATUS FOR DECODING IMAGE BY USING ATYPICAL SPLIT

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Sun-il Lee, Seoul (KR); Won Woo Ro, Seoul (KR); Kyungah Kim, Seoul (KR); Minsik Kim, Seoul (KR); Chan-yul Kim, Seongnam-si (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 154 days.

(21) Appl. No.: 16/007,375

(22) Filed: Jun. 13, 2018

(65) Prior Publication Data
US 2019/0058893 A1 Feb. 21, 2019

(30) Foreign Application Priority Data
Aug. 16, 2017 (KR) .......................... 10-2017-0103717

(51) Int. Cl.
*H04N 11/02* (2006.01)
*H04N 19/436* (2014.01)
*H04N 19/46* (2014.01)
*H04N 19/172* (2014.01)
*H04N 19/44* (2014.01)
*H04N 19/176* (2014.01)
(Continued)

(52) U.S. Cl.
CPC ......... *H04N 19/436* (2014.11); *H04N 19/119* (2014.11); *H04N 19/14* (2014.11); *H04N 19/172* (2014.11); *H04N 19/176* (2014.11); *H04N 19/44* (2014.11); *H04N 19/46* (2014.11)

(58) Field of Classification Search
CPC .... H04N 19/436; H04N 19/14; H04N 19/119; H04N 19/176; H04N 19/44; H04N 19/172; H04N 19/46
See application file for complete search history.

(56) References Cited

U.S. PATENT DOCUMENTS

| 9,270,994 B2 | 2/2016 | Fuldseth | |
| 2010/0027686 A1* | 2/2010 | Zuo | H04N 19/46 375/240.29 |

(Continued)

*Primary Examiner* — Howard D Brown, Jr.
(74) *Attorney, Agent, or Firm* — Sughrue Mion, PLLC

(57) ABSTRACT

Provided is an image encoding method including extracting feature points from a picture; generating at least two clusters by performing feature point clustering on the extracted feature points; determining at least two split sections in the picture, the at least two split sections respectively corresponding to the at least two clusters; parallel-encoding the at least two split sections; and generating a bitstream including information about the at least two split sections. A size and a shape of each of the at least two split sections may be individually determined.

17 Claims, 23 Drawing Sheets

(51) Int. Cl.
*H04N 19/119* (2014.01)
*H04N 19/14* (2014.01)

(56) References Cited

U.S. PATENT DOCUMENTS

| | | | |
|---|---|---|---|
| 2011/0116550 A1* | 5/2011 | Lee ........................ | H04N 19/44 |
| | | | 375/240.25 |
| 2011/0249899 A1* | 10/2011 | Wu ....................... | G06K 9/6211 |
| | | | 382/190 |
| 2012/0106622 A1* | 5/2012 | Huang ................. | H04N 19/426 |
| | | | 375/240.01 |
| 2012/0121011 A1* | 5/2012 | Coban ................... | H04N 19/436 |
| | | | 375/240.03 |
| 2013/0044820 A1* | 2/2013 | Haimi-Cohen ...... | H04N 19/136 |
| | | | 375/240.24 |

\* cited by examiner

CODING UNIT (1010)

METHOD AND APPARATUS FOR ENCODING IMAGE BY USING ATYPICAL SPLIT, AND METHOD AND APPARATUS FOR DECODING IMAGE BY USING ATYPICAL SPLIT

CROSS-REFERENCE TO RELATED APPLICATION

This application is based on and claims priority under 35 U.S.C. § 119 to Korean Patent Application No. 10-2017-0103717, filed on Aug. 16, 2017, in the Korean Intellectual Property Office, the disclosure of which is incorporated by reference herein in its entirety.

BACKGROUND

1. Field

The disclosure relates to a method and apparatus for parallel-encoding an image, and a method and apparatus for parallel-decoding the image.

2. Description of the Related Art

The High Efficiency Video Coding (HEVC) standard, which is one of current image compression standards, supports tiles and wavefront parallel processing (WPP) so as to parallel-encode a video.

Each of the tiles is a split section having a rectangular shape and including coding tree units, and the tiles are parallel-encoded. Thus, data dependency between the tiles may be interrupted. Due to characteristics of video encoding in which compression is performed by using data similarities with a pre-encoded block, compression efficiency of parallel-encoding may deteriorate to a greater degree than when sequential-encoding is used.

In the WPP, each of coding tree unit rows is parallel-encoded by using a coding tree unit row of a picture as a split section. Also, in the WPP, the compression rate may deteriorate due to the interruption of data dependency, and in order to decrease the deterioration in the compression rate, first two coding tree units of a split section may be encoded, and then the next split section may be encoded by referring to the first two coding tree units of the split section. That is, in the WPP, a split section is not encoded in a complete parallel manner, which creates a latency for two coding tree units in every split section.

As described above, the tiles have high scalability but a picture is typically split without consideration of content in the picture, such that a compression rate may significantly deteriorate. In addition, performing the WPP decreases the deterioration in the compression rate, but may have limited scalability.

SUMMARY

Provided are a method and apparatus for parallel-encoding an image, and a method and apparatus for parallel-decoding the image, by atypically splitting the image.

Additional aspects will be set forth in part in the description which follows and, in part, will be apparent from the description, or may be learned by practice of the presented embodiments.

In accordance with an aspect of the disclosure, an image encoding method may include extracting feature points from a picture; generating at least two clusters by performing feature point clustering on the extracted feature points; determining at least two split sections in the picture, the at least two split sections respectively corresponding to the at least two clusters; parallel-encoding the at least two split sections; and generating a bitstream including information about the at least two split sections. A size and a shape of each of the at least two split sections may be individually determined.

In accordance with another aspect of the disclosure, an image encoding apparatus may include a cluster generator configured to extract feature points from a picture, and generate at least two clusters by performing feature point clustering on the extracted feature points; a split section determiner configured to determine at least two split sections in the picture, the at least two split sections respectively corresponding to the at least two clusters; and a bitstream generator configured to parallel-encode the at least two split sections, and generate a bitstream including information about the at least two split sections. A size and a shape of each of the at least two split sections may be individually determined.

In accordance with another aspect of the disclosure, an image decoding method may include receiving a bitstream including split section information; determining at least two split sections based on the split section information; and reconstructing an image by performing parallel-decoding on the at least two split sections.

In accordance with another aspect of the disclosure, an image decoding apparatus may include a receiver configured to receive a bitstream including split section information; a split section determiner configured to determine at least two split sections based on the split section information; and a decoder configured to reconstruct an image by performing parallel-decoding on the at least two split sections.

In accordance with another aspect of the disclosure, a non-transitory computer-readable recording medium may include instructions for implementing the image encoding method.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, with reference to FIGS. 1 through 27, various embodiments of a method and apparatus for parallel-encoding an image, and a method and apparatus for parallel-decoding the image will now be described. In more detail, various embodiments of parallel-encoding and parallel-decoding an image will now be described with reference to FIGS. 1 through 7, and various embodiments of encoding and decoding a video based on hierarchical data units according to regions will now be described with reference to FIGS. 8 through 20. Also, with reference to FIGS. 21 through 27, various embodiments to which the video encoding apparatus and the video decoding apparatus are applicable will be described.

As used herein, the term "and/or" includes any and all combinations of one or more of the associated listed items. Expressions such as "at least one of," when preceding a list of elements, modify the entire list of elements and do not modify the individual elements of the list.

Throughout the specification, an image includes a still image and a moving picture, and may be referred to as a video. In addition, throughout the specification, a picture may be referred to as an image frame.

Hereinafter, with reference to FIGS. 1 through 7, embodiments of parallel-encoding an image, and embodiments of parallel-decoding an image will now be described.

Figure 1:
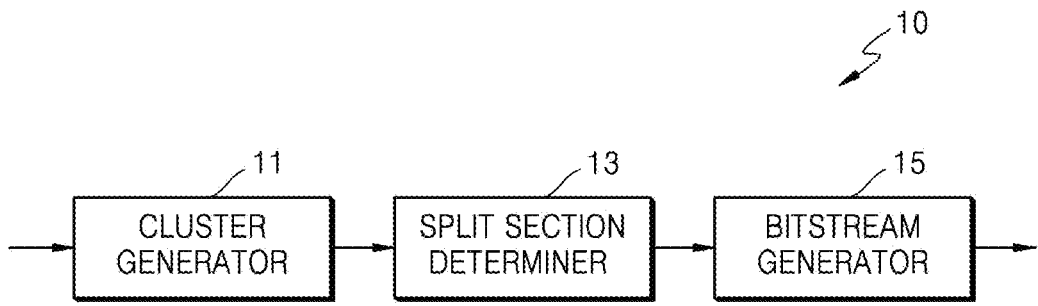
FIG. 1 is a block diagram of an image encoding apparatus, according to an embodiment.

FIG. 1 is a block diagram of an image encoding apparatus 10, according to an embodiment.

The image encoding apparatus 10 according to the present embodiment may include a cluster generator 11, a split section determiner 13, and a bitstream generator 15. The image encoding apparatus 10 according to another embodiment may further include a verifier in addition to the cluster generator 11, the split section determiner 13, and the bitstream generator 15. The image encoding apparatus 10 may include at least one processor for controlling the cluster generator 11, the split section determiner 13, the bitstream generator 15, and the verifier. For example, the image encoding apparatus 10 may include a central processor for generally controlling the cluster generator 11, the split section determiner 13, the bitstream generator 15, and the verifier. Alternatively, the cluster generator 11, the split section determiner 13, the bitstream generator 15, and the verifier may be operated by individual processors, and the image encoding apparatus 10 may be operated as the individual processors systematically operate. Alternatively, the cluster generator 11, the split section determiner 13, the bitstream generator 15, and the verifier may be controlled by the control of an external processor of the image encoding apparatus 10.

The cluster generator 11 may extract feature points from a picture included in an image sequence so as to generate a cluster.

A feature point is extracted from a picture by using a feature point extracting algorithm, and may correspond to a predetermined pixel indicating a feature of the picture. In the present embodiment, the feature point may be a corner, an edge, a point of interest (POI), or the like in the picture. For example, the cluster generator 11 may detect a corner in the picture by using a features from accelerated segment test (FAST) algorithm. For example, the cluster generator 11 may compare a pixel with nine through twelve neighboring pixels, and when the pixel is brighter or darker than the predetermined number of pixels from among the neighboring pixels, the cluster generator 11 may determine the pixel as a corner.

The cluster generator 11 may perform feature point clustering on the extracted feature points, thereby generating at least two clusters.

In the present embodiment, feature points are characterized by being concentrated in an object in a picture, thus, when feature point clustering is performed, clusters respectively corresponding to objects in the picture may be generated.

A cluster may be a group of feature points extracted from a picture, and one cluster may correspond to one object.

The cluster generator 11 may perform feature point clustering so as to allow two clusters to have a same number of feature points therebetween. For example, the cluster generator 11 may perform, by using Equation 1 below, feature point clustering based on distances between a center of a cluster and feature points, and the number of the feature points included in the cluster.

$$\text{cluster\_point}[c] = a*\text{distance}[c][i] + b*\text{cluster\_cnt}[c]a+b=1.0 \quad \text{[Equation 1]}$$

When a and b are real numbers less than or equal to 1, the cluster generator 11 may calculate a point of a c-th cluster (cluster_point[c]) so as to determine in which cluster an i-th feature point is included, by considering a distance (distance [c][i]) between a center of the c-th cluster and the i-th feature point, and the number of feature points (cluster_cnt[c]) included in the c-th cluster. In addition, the cluster generator 11 may calculate not only the point of the c-th cluster (cluster_point[c]) but may also calculate a point of each cluster (cluster_point), thereby determining a cluster having a lowest calculated point to be a cluster including the i-th feature point.

In the present embodiment, a that is a weight of the distance (distance[c][i]) between the center of the c-th cluster and the i-th feature point, and b that is a weight of the point of the c-th cluster (cluster_point[c]) may be initially set as a=1.0 and b=0. When a standard deviation between the numbers of feature points of at least two clusters generated by the cluster generator 11 is greater than a threshold value, a weight of the numbers of features points may be increased and then points may be recalculated. The threshold value may be a preset value in the image encoding apparatus 10. For example, a point of each of at least two clusters may be calculated by increasing b by 0.1, and by doing so, the number of feature points of a cluster may further involve in a point. Thus, when feature points are concentrated in a particular cluster, a higher weight is applied to the number of the feature points, such that feature points may be equally distributed between at least two clusters.

The split section determiner 13 according to the present embodiment may determine at least two split sections that respectively correspond to at least two clusters and are from among split sections generated by splitting a picture. For example, one cluster may correspond to one split section. In this regard, because one cluster may correspond to one object, one split section may correspond to one object. A split section may be configured of at least one block. A block may be, but is not limited to, a largest coding unit (LCU), a coding unit, a prediction unit, a transform unit, or the like.

When an LCU includes feature points of at least two clusters, the split section determiner 13 may determine split sections such that a split section corresponding to a cluster having more feature points includes the LCU. An example of determining the split sections with respect to the LCU including the feature points of at least two clusters will be described below with reference to FIG. 7.

The verifier according to the present embodiment may perform verification on a boundary of a split section. In order to perform verification on the boundary of the split section, the verifier may generate a feature point map with respect to the picture, based on the number of feature points included in each LCU. In the present embodiment, the feature point map may be generated in a manner that the number of feature points included in each LCU is normalized, imaging is performed thereon, and then a Laplacian filter is applied to an image generated by the imaging. When a value of the feature point map with respect to a first LCU adjacent to the boundary of the split section is greater than a threshold value, the boundary may be determined to be appropriate. Alternatively, when the value of the feature point map with respect to the first LCU adjacent to the boundary of the split section is not greater than the threshold value, the boundary of the split section may be re-determined to be a second LCU that has a largest value of the feature point map and is from among LCUs adjacent to the first LCU. That is, a split section, from among the split sections forming the boundary, to which the first LCU is to belong may be re-determined.

For example, in order to generate the feature point map, a pixel value may be set based on the number of feature points of each of LCUs. For example, when one picture includes a third LCU, a fourth LCU, a fifth LCU, and a sixth LCU, and the number of the third LCU is 20, the number of the fourth LCU is 30, the number of the fifth LCU is 0, and the number of the sixth LCU is 50, the third LCU, the fourth LCU, the fifth LCU, and the sixth LCU may be imaged with a value of 20/100*256, a value of 30/100*256, a value of 0/100*256, and a value of 50/100*256, respectively. In this regard, 256 may be a grayscale range of the pixel value. A boundary between LCUs having a large difference between values of feature point maps obtained by applying the Laplacian filter to the image that is imaged in the aforementioned manner is brightly displayed, and when a value of a feature point map is greater than the threshold value, the boundary may be determined to be appropriate.

The bitstream generator 15 according to the present embodiment may encode an image of a picture unit in an input image sequence. The bitstream generator 15 may perform motion estimation, inter prediction, intra prediction, frequency transformation, quantization, or the like on the input image, thereby generating encoded image data.

The bitstream generator 15 may encode the image by using various video encoding methods including MPEG-1, MPEG-2, MPEG-4, H.26x, or the like, thereby generating a bitstream. For example, the bitstream generator 15 may use a video encoding method based on hierarchical data units according to regions according to an embodiment, wherein the video encoding method is to be described below with reference to FIGS. 8 through 27.

The bitstream generator 15 may generate and output the bitstream including split section information and the encoded image data. For example, the encoded image data may be transformed to the bitstream via entropy encoding. In addition, for example, the bitstream generator 15 may receive an input of split section information about split sections of the image of the picture unit, encode the information, and insert the information into the bitstream. For example, the split section information may include information about the number of the split sections included in the picture, information about the number of LCUs included in each of the split sections, information about positions of the split sections in the picture, or the like.

The image encoding apparatus 10 according to the present embodiment may provide the split section information, which can be obtained during an encoding process, to an image decoding apparatus 30 to parallel-decode the split sections.

Figure 2:
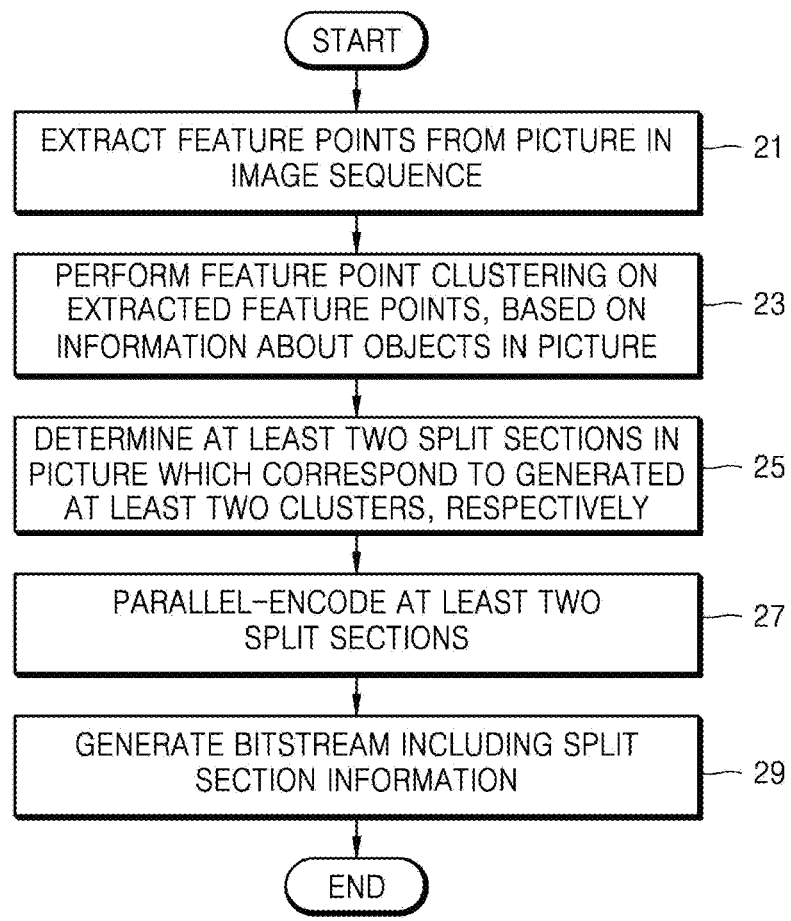
FIG. 2 is a flowchart of an image encoding method, according to an embodiment.

FIG. 2 is a flowchart of an image encoding method, according to an embodiment.

In operation 21, feature points may be extracted from a picture in an image sequence.

In operation 23, feature point clustering may be performed on the extracted feature points, so that at least two clusters may be generated. In the present embodiment, information about objects may include information about a type of the objects included in the picture, information about positions of the objects in the picture, information about a correlation between the objects, or the like. In the present embodiment, feature point clustering may be performed based on distances between a center of a cluster and the feature points, and the number of the feature points included in the cluster, such that the extracted feature points may be equally distributed (e.g., evenly distributed) between at least two clusters. For example, a score of each of the at least two clusters may be calculated based on distances between a center of a cluster and the feature points, and the number of the feature points included in the cluster, and a cluster having a lowest calculated score from among the at least two clusters may be determined to be a cluster including the feature points. When a standard deviation between the numbers of feature points of the at least two clusters is greater than a threshold value, the score may be recalculated while increasing a weight of the number of features points, and then a cluster having a lowest recalculated score from among the at least two clusters may be determined to be a cluster including the feature points.

In operation 25, at least two split sections in the picture which respectively correspond to the at least two clusters may be determined. In the present embodiment, a size and shape of each of the at least two split sections may be individually determined. For example, the size and shape may be non-uniform among the at least two split sections.

In the present embodiment, a split section may include at least one LCU. In addition, when an LCU includes feature points of at least two clusters, split sections may be determined such that a split section corresponding to a cluster having more feature points may include the LCU.

In the present embodiment, after the at least two split sections are determined, verification may be performed on a boundary between the split sections. For example, a feature point map with respect to the picture may be generated based on the number of feature points included in each LCU. Also, it may be determined whether a value of the feature point map in an LCU on the boundary between the split sections is greater than a threshold value. When the value of the feature point map in the LCU is not greater than the threshold value, a split section, from among the split sections forming the boundary, to which the LCU is to belong may be re-determined. When the value of the feature point map in the LCU is greater than the threshold value, the split section to which the LCU belongs may be confirmed as an appropriate split section.

In operation 27, the at least two split sections may be parallel-encoded. In operation 29, a bitstream including split section information may be generated. In the present embodiment, the bitstream including the split section information, and encoded image data of each split section may be generated and transmitted to a decoder. According to the image encoding method, even though compression efficiency of parallel-encoding is supposed to be lower than that of sequential-encoding, due to characteristic of image encoding in which compression is performed by using similarities with a pre-encoded block, the picture is atypically split so that deterioration of the compression efficiency may be minimized. For example, the picture may be divided up into sections of non-uniform shapes and/or sizes.

Figure 3:
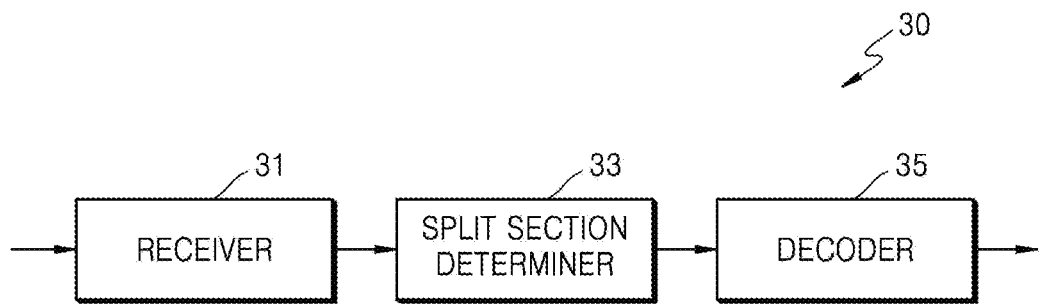
FIG. 3 is a block diagram of an image decoding apparatus, according to an embodiment.

FIG. 3 is a block diagram of the image decoding apparatus 30, according to an embodiment.

The image decoding apparatus 30 according to the present embodiment may include a receiver 31, a split section determiner 33, and a decoder 35.

The receiver 31 according to the present embodiment may receive and parse a bitstream including split section information.

The split section determiner 33 according to the present embodiment may extract encoded image data and split section information from the bitstream parsed by the receiver 31. For example, the split section information may include information about the number of split sections included in a picture, the number of LCUs included in each of the split sections, positions of the split sections in the picture, boundaries of the split sections, or the like. For example, the split section determiner 33 may extract, from the bitstream, the information about the number of split sections included in a picture, the number of LCUs included in each of the split sections, positions of the split sections in the picture, boundaries of the split sections, or the like. In addition, the split section determiner 33 may extract encoding information such as an encoding method, an encoding mode, or the like, which is required to decode the encoded image data.

The decoder 35 according to the present embodiment may receive an input of at least two split sections determined by the split section determiner 33, the encoded image data, the encoding information, or the like, and may perform parallel-decoding on the at least two split sections, thereby reconstructing an image. Decoding with respect to the encoded image data may be performed as an inverse-process of a video encoding method performed on the encoded image data. For example, when the encoded image data is encoded by using a video encoding method based on hierarchical data units of regions according to an embodiment, and then is transmitted, the decoder 35 may decode the image data by using a video decoding method based on hierarchical data units according to regions.

The decoder 35 may selectively perform deblocking filtering or in-loop filtering such as Sample Adaptive Offset (SAO) or the like on decoded image data.

Figure 4:
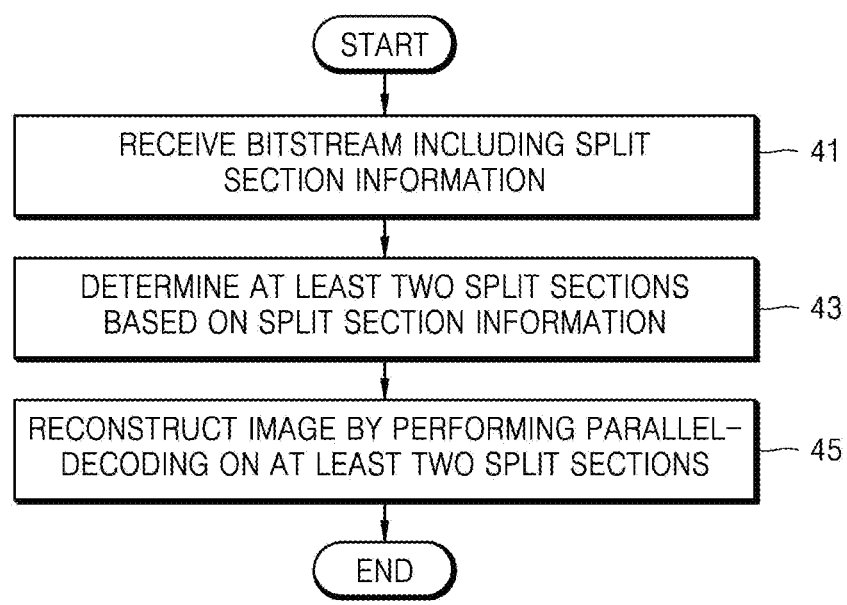
FIG. 4 is a flowchart of an image decoding method, according to an embodiment.

FIG. 4 is a flowchart of an image decoding method, according to an embodiment.

In operation 41, a bitstream including split section information may be received. In the present embodiment, the bitstream about an encoded image may be received and parsed, and encoded image data and the split section information may be extracted from the bitstream.

In operation 43, at least two split sections may be determined based on the split section information.

In operation 45, an image may be reconstructed by performing parallel-decoding on the at least two split sections.

According to the image decoding method according to the present embodiment, even though decompression efficiency of parallel-decoding is supposed to be lower than that of sequential-decoding, due to characteristic of image decoding in which decompression is performed by using similarities with a pre-decoded block, deterioration of the decompression efficiency may be minimized based on information about atypical split sections.

Figure 5:
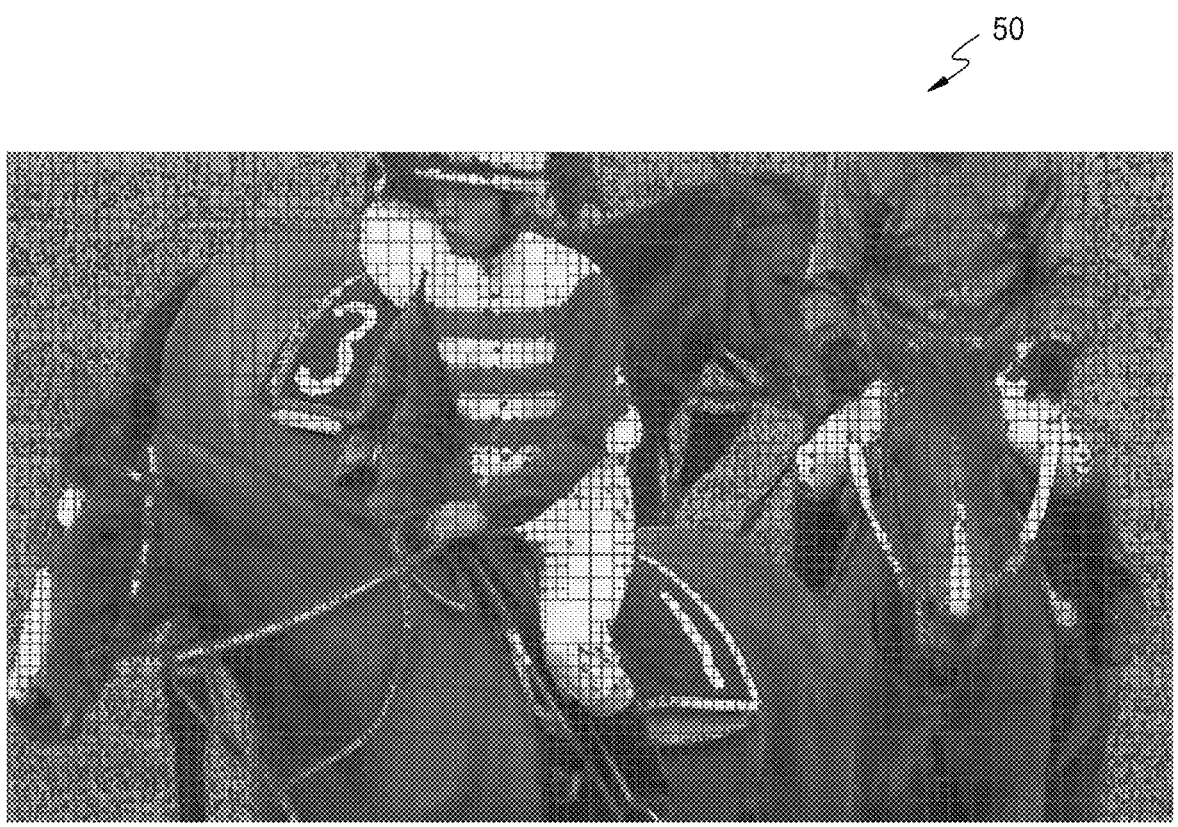
FIG. 5 shows an example of a picture from which feature points are extracted, according to an embodiment.

FIG. 5 shows an example of a picture 50 from which feature points are extracted, according to an embodiment.

In the present embodiment, a first horse, a second horse, a third horse, a first person riding the first horse, and a second person riding the second horse. A feature point may be a pixel indicating a corner in a picture 50, thus, many feature points may be distributed at boundaries of objects in the picture 50. Thus, as shown in FIG. 5, the objects included in the picture 50 may be distinguished by extracted feature points. When feature point clustering is performed by analyzing a distribution of feature points, a cluster based on object information may be generated. Thus, a picture may be split according to objects so that motion information to be encoded may be referred to when encoding is performed on a motion of a particular object. Therefore, when the picture 50 is split by taking into account the objects included in the picture 50, it is possible to prevent the compression efficiency from deteriorating at a boundary of a split section. Hereinafter, with reference to FIG. 6, an example of a picture that is atypically split according to split sections corresponding to clusters will now be described.

Figure 6:
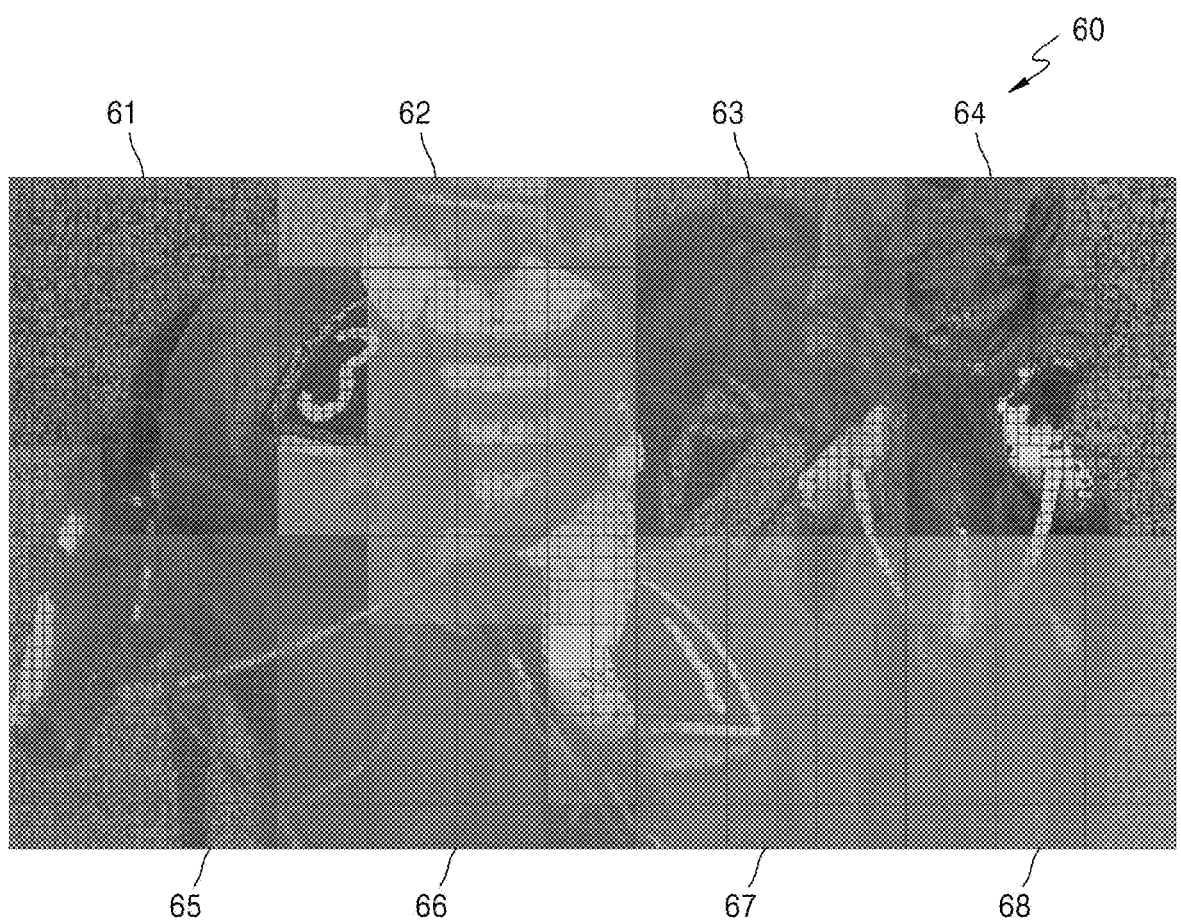
FIG. 6 illustrates an example of split sections of a picture, according to an embodiment.

FIG. 6 illustrates an example of split sections 61, 62, 63, 64, 65, 66, 67, and 68 of a picture 60, according to an embodiment.

The picture 60 shown in FIG. 6 includes the split sections 61, 62, 63, 64, 65, 66, 67, and 68 which are determined based on information of objects included in the picture 60.

In the present embodiment, in a case of three split sections 65, 66, and 67 included in the picture 60, although a plurality of split sections are present with respect to one horse, the split sections may be verified whether boundaries of the split sections 61, 62, 63, 64, 65, 66, 67, and 68 are appropriate, and as a result, three split sections 65, 66, and 67 may be combined as one split section.

In the present embodiment, a size and shape of each of the split sections 61, 62, 63, 64, 65, 66, 67, and 68 may be individually determined. It is possible to see that split sections of the picture 60 have different sizes and shapes, except for three split sections 65, 66, and 67. In the present embodiment, boundaries of the split sections 61, 62, 63, 64, 65, 66, 67, and 68 may not be parallel with or perpendicular to each other. For example, boundaries of two split sections 63 and 64 are parallel with boundaries of two split sections 67 and 68, but boundaries of two split sections 61 and 62 are not parallel with boundaries of two split sections 66 and 67. In addition, the boundaries of the split sections 61, 62, 63, 64, 65, 66, 67, and 68 may not be parallel with or perpendicular to outlines of the picture 60. For example, the boundaries of two split sections 63 and 64 are vertical to a top outline of the picture 60, but boundaries of two split sections 61 and 65 are not perpendicular to a left outline of the picture 60.

Figure 7:
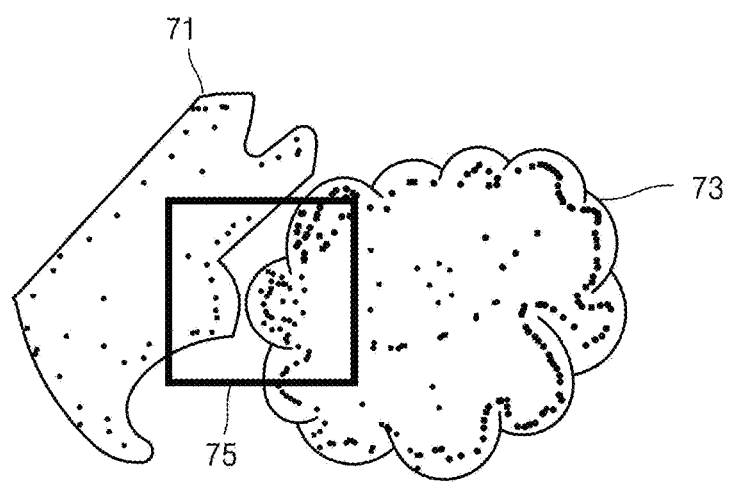
FIG. 7 illustrates an example in which a split section is determined with respect to a largest coding unit including feature points of at least two clusters, according to an embodiment.

FIG. 7 illustrates an example in which a split section is determined with respect to an LCU 75 including feature points of at least two clusters 71 and 73, according to an embodiment.

As illustrated in FIG. 7, one LCU 75 may include feature points of a first cluster 71 and feature points of a second cluster 73. In this case, when the LCU 75 includes 13 feature points of the first cluster 71, and 45 feature points of the second cluster 73, the LCU 75 may be included in a second split section from among a first split section corresponding to the first cluster 71 and the second split section (e.g., a specific split section) corresponding to the second cluster 73 that has more feature points (e.g., the highest number of feature points). Because the LCU 75 is classified based on the number of feature points, a split section may further reflect a cluster such that compression efficiency of an image may be improved.

Hereinafter, with reference to FIGS. 8 through 20, a video encoding method, a video encoding apparatus, a video decoding method, and a video decoding apparatus based on coding units having a tree structure and transform units, according to various embodiments, will be described.

Figure 8:
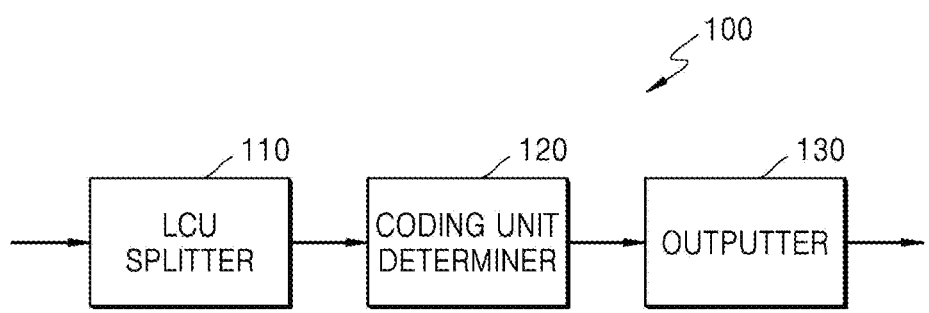
FIG. 8 is a block diagram of a video encoding apparatus based on coding units of a tree structure, according to an embodiment.

FIG. 8 is a block diagram of a video encoding apparatus based on coding units of a tree structure 100, according to an embodiment.

The video encoding apparatus involving video prediction based on coding units of the tree structure 100 includes a coding unit determiner 120 and an output unit 130. Hereinafter, for convenience of description, the video encoding apparatus involving video prediction based on coding units of the tree structure 100 is referred to as the video encoding apparatus 100.

The image encoding apparatus 10 described above with reference to FIG. 1 is a particular embodiment of the video encoding apparatus 100 according to the present embodiment. An LCU splitter 110 and a coding unit determiner 120 of the video encoding apparatus 100 may correspond to the split section determiner 13 of the image encoding apparatus 10, and an output unit 130 of the video encoding apparatus 100 may correspond to the bitstream generator 15 of the image encoding apparatus 10.

The coding unit determiner 120 may split a current picture based on an LCU that is a coding unit having a maximum size for a current picture of an image. When the current picture is larger than the LCU, image data of the current picture may be split into the at least one LCU. The LCU according to various embodiments may be a data unit having a size of 32×32, 64×64, 128×128, 256×256, etc., wherein a shape of the data unit is a square having a width and length in powers of 2.

A coding unit according to various embodiments may be characterized by a maximum size and a depth. The depth denotes the number of times the coding unit is spatially split from the LCU, and as the depth increases, deeper coding units according to depths may be split from the LCU to a smallest coding unit. A depth of the LCU may be defined as an uppermost depth and a depth of the smallest coding unit may be defined as a lowermost depth. Since a size of a coding unit corresponding to each depth decreases as the depth of the LCU increases, a coding unit corresponding to an upper depth may include a plurality of coding units corresponding to lower depths.

As described above, the image data of the current picture is split into the LCUs according to a maximum size of the coding unit, and each of the LCUs may include deeper coding units that are split according to depths. Since the LCU according to various embodiments is split according to depths, the image data of a spatial domain included in the LCU may be hierarchically classified according to depths.

A maximum depth and a maximum size of a coding unit, which limit the total number of times a height and a width of the LCU are hierarchically split, may be predetermined.

The coding unit determiner 120 encodes at least one split region obtained by splitting a region of the LCU according to depths, and determines a depth to output a finally encoded image data according to the at least one split region. That is, the coding unit determiner 120 determines a final depth by encoding the image data in the deeper coding units according to depths, according to the LCU of the current picture, and selecting a depth having the minimum encoding error. The determined final depth and image data according to LCUs are output to the output unit 130.

The image data in the LCU is encoded based on the deeper coding units corresponding to at least one depth equal to or below the maximum depth, and results of encoding the image data based on each of the deeper coding units are compared. A depth having the minimum encoding error may be selected after comparing encoding errors of the deeper coding units. At least one final depth may be selected for each LCU.

The size of the LCU is split as a coding unit is hierarchically split according to depths, and as the number of coding units increases. Also, even if coding units correspond to the same depth in one LCU, it is determined whether to split each of the coding units corresponding to the same depth to a lower depth by measuring an encoding error of the image data of the each coding unit, separately. Accordingly, even when image data is included in one LCU, the encoding errors may differ according to regions in the one LCU, and thus the final depths may differ according to regions in the image data. Thus, one or more final depths may be determined in one LCU, and the image data of the LCU may be divided according to coding units of at least one final depth.

Accordingly, the coding unit determiner 120 according to various embodiments may determine coding units having a tree structure included in the current LCU. The "coding units having a tree structure" according to various embodiments include coding units corresponding to a depth determined to be the final depth, from among all deeper coding units included in the current LCU. A coding unit of a final depth may be hierarchically determined according to depths in the same region of the LCU, and may be independently determined in different regions. Equally, a final depth in a current region may be independently determined from a final depth in another region.

A maximum depth according to various embodiments is an index related to the number of splitting times from an LCU to a smallest coding unit A first maximum depth according to various embodiments may denote the total number of splitting times from the LCU to the smallest coding unit. A second maximum depth according to various embodiments may denote the total number of depth levels from the LCU to the smallest coding unit. For example, when a depth of the LCU is 0, a depth of a coding unit, in which the LCU is split once, may be set to 1, and a depth of a coding unit, in which the LCU is split twice, may be set to 2. In this regard, when the smallest coding unit is a coding unit in which the LCU is split four times, depth levels of depths 0, 1, 2, 3, and 4 exist, and thus the first maximum depth may be set to 4, and the second maximum depth may be set to 5.

Prediction encoding and transformation may be performed according to the LCU. The prediction encoding and the transformation are also performed based on the deeper coding units according to a depth equal to or depths less than the maximum depth, according to the LCU.

Since the number of deeper coding units increases whenever the LCU is split according to depths, encoding, including the prediction encoding and the transformation, is performed on all of the deeper coding units generated as the depth increases. Hereinafter, for convenience of description, the prediction encoding and the transformation will be described based on a coding unit of a current depth in at least one LCU.

The video encoding apparatus 100 according to various embodiments may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the LCU, the prediction encoding may be performed based on a coding unit corresponding to a final depth according to various embodiments, i.e., based on a coding unit that is no longer split to coding units corresponding to a lower depth. Hereinafter, the coding unit that is no longer split and becomes a basis unit for prediction encoding will now be referred to as a "prediction unit." A partition obtained by splitting the prediction unit may include a prediction unit and a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split, it becomes a prediction unit of 2N×2N, and a size of a partition may be 2N×2N, 2N×N, N×2N, or N×N. Examples of a partition mode may include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, partitions having arbitrary shapes, or the like.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 100 according to various embodiments may perform not only the transformation on the image data in a coding unit based not only on the coding unit for encoding the image data, but also may perform the transformation on the image data based on a data unit that is different from the coding unit. In order to perform the transformation in the coding unit, the transformation may be performed based on a transform unit having a size smaller than or equal to the coding unit. For example, the transform unit may include a data unit for an intra mode and a transform unit for an inter mode.

The transform unit in the coding unit may be recursively split into smaller sized regions in a manner similar to that in which the coding unit is split according to the tree structure, according to various embodiments. Thus, residual data in the coding unit may be split according to the transform unit having the tree structure according to transformation depths.

A transformation depth indicating the number of splitting times to reach the transform unit by splitting the height and width of the coding unit may also be set in the transform unit according to various embodiments. For example, in a current coding unit of 2N×2N, a transformation depth may be 0 when the size of a transform unit is 2N×2N, may be 1 when the size of the transform unit is N×N, and may be 2 when the size of the transform unit is N/2×N/2. That is, with respect to the transform unit, the transform unit having the tree structure may be set according to the transformation depths.

Split information according to depths requires not only information about a depth but also requires information related to prediction and transformation. Accordingly, the coding unit determiner 120 may determine not only a depth generating a minimum encoding error but may also determine a partition mode in which a prediction unit is split to partitions, a prediction mode according to prediction units, and a size of a transform unit for transformation.

Coding units according to a tree structure in an LCU and methods of determining a prediction unit/partition, and a transform unit, according to various embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs, in bitstreams, the image data of the LCU, which is encoded based on the at least one depth determined by the coding unit determiner 120, and split information according to depths.

The encoded image data may correspond to a result obtained by encoding residual data of an image.

The split information according to depths may include depth information, partition mode information of the prediction unit, prediction mode information, and the split information of the transform unit.

Final-depth information may be defined by using split information according to depths, which specifies whether encoding is performed on coding units of a lower depth instead of a current depth. When the current depth of the current coding unit is a depth, the current coding unit is encoded by using the coding unit of the current depth, and thus split information of the current depth may be defined not to split the current coding unit to a lower depth. On the contrary, when the current depth of the current coding unit is not the depth, the encoding has to be performed on the coding unit of the lower depth, and thus the split information of the current depth may be defined to split the current coding unit to the coding units of the lower depth.

When the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed on the coding units having the same depth.

Since the coding units having a tree structure are determined for one LCU, and at least one piece of split information has to be determined for a coding unit of a depth, at least one piece of split information may be determined for one LCU. Also, data of the LCU may vary according to locations since the data is hierarchically split according to depths, and thus a depth and split information may be set for the data.

Accordingly, the output unit 130 according to various embodiments may assign encoding information about a corresponding depth and an encoding mode to at least one of the coding unit, the prediction unit, and a minimum unit included in the LCU.

The minimum unit according to various embodiments is a square data unit obtained by splitting the smallest coding unit constituting the lowermost depth by 4. Alternatively, the minimum unit according to various embodiments may be a maximum square data unit that may be included in all of the coding units, prediction units, partition units, and transform units included in the LCU.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transform unit permitted with respect to a current video, and information about a minimum size of the transform unit may also be output through a header of a bitstream, a sequence parameter set, or a picture parameter set. The output unit 130 may encode and output reference information, prediction information, and slice type information, which are related to prediction.

According to the simplest embodiment of the video encoding apparatus 100, the deeper coding unit may be a coding unit obtained by dividing a height and width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each LCU, based on the size of the LCU and the maximum depth determined considering characteristics of the current picture. Also, since encoding may be performed on each LCU by using any one of various prediction modes and transformations, an optimum encoding mode may be determined by taking into account characteristics of the coding unit of various image sizes.

Thus, when an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to various embodiments, image compression efficiency may be increased since a coding unit is adjusted while considering characteristics of an image while increasing a maximum size of a coding unit while considering a size of the image.

Figure 9:
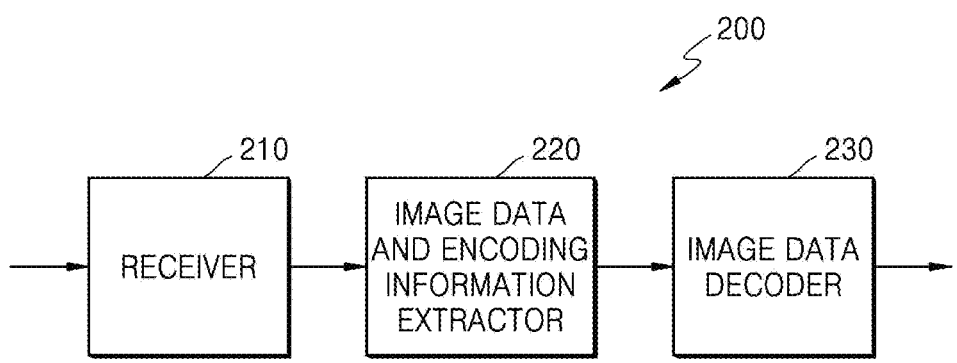
FIG. 9 is a block diagram of a video decoding apparatus based on coding units of a tree structure, according to an embodiment.

FIG. 9 is a block diagram of a video decoding apparatus based on coding units according to tree structure 200, according to various embodiments.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the video decoding apparatus 200.

The image decoding apparatus 30 described above with reference to FIG. 3 is a particular embodiment of the video decoding apparatus 200 according to the present embodiment. The receiver 210, the image data and encoding information extractor 220, and the image data decoder 230 of the video decoding apparatus 200 may correspond to the receiver 31, the split section determiner 33, and the decoder 35 of the image decoding apparatus 30, respectively, according to elements.

Definitions of various terms, such as a coding unit, a depth, a prediction unit, a transform unit, and various split information, for decoding operations of the video decoding apparatus 200 according to various embodiments are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each LCU, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, a final depth and split information about the coding units having a tree structure according to each LCU. The extracted final depth and the extracted split information are output to the image data decoder 230. That is, the image data in a bitstream is split into the LCU so that the image data decoder 230 may decode the image data for each LCU.

A depth and split information according to each of the LCUs may be set for one or more pieces of depth information, and split information according to depths may include partition mode information of a corresponding coding unit, prediction mode information, and split information of a transform unit. Also, as the depth information, the split information according to depths may be extracted.

The depth and the split information according to each of the LCUs extracted by the image data and encoding information extractor 220 are a depth and split information determined to generate a minimum encoding error when an encoder, such as the video encoding apparatus 100, repeatedly performs encoding on each deeper coding unit according to depths according to each LCU. Accordingly, the video decoding apparatus 200 may reconstruct an image by decoding data according to an encoding method that generates the minimum encoding error.

Since encoding information according to various embodiments about a depth and an encoding mode may be assigned to a predetermined data unit from among a corresponding coding unit, a prediction unit, and a minimum unit, the image data and encoding information extractor 220 may extract the depth and the split information according to the predetermined data units. When a depth and split information of a corresponding LCU are recorded according to each of the predetermined data units, predetermined data units having the same depth and the split information may be inferred to be the data units included in the same LCU.

The image data decoder 230 may reconstruct the current picture by decoding the image data in each LCU based on the depth and the split information according to the LCUs. That is, the image data decoder 230 may decode the encoded image data, based on a read partition mode, a prediction mode, and a transform unit for each coding unit from among the coding units having the tree structure included in each LCU. A decoding process may include a prediction process including intra prediction and motion compensation, and an inverse transformation process.

The image data decoder 230 may perform intra prediction or motion compensation according to a partition and a prediction mode of each coding unit, based on the information about the partition mode and the prediction mode of the prediction unit of the coding unit according to depths.

In addition, for inverse transformation for each LCU, the image data decoder 230 may read information about a transform unit according to a tree structure for each coding unit so as to perform inverse transformation based on transform units for each coding unit. Due to the inverse transformation, a pixel value of a spatial domain of the coding unit may be reconstructed.

The image data decoder 230 may determine a depth of a current LCU by using split information according to depths. When the split information indicates that image data is no longer split in the current depth, the current depth is a depth. Accordingly, the image data decoder 230 may decode the image data of the current LCU by using the information about the partition mode of the prediction unit, the prediction mode, and the size of the transform unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Thus, the video decoding apparatus 200 may obtain information about at least one coding unit that generates the minimum encoding error when encoding is recursively performed for each LCU, and may use the information to decode the current picture. That is, the coding units having the tree structure determined to be the optimum coding units in each LCU may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 10:
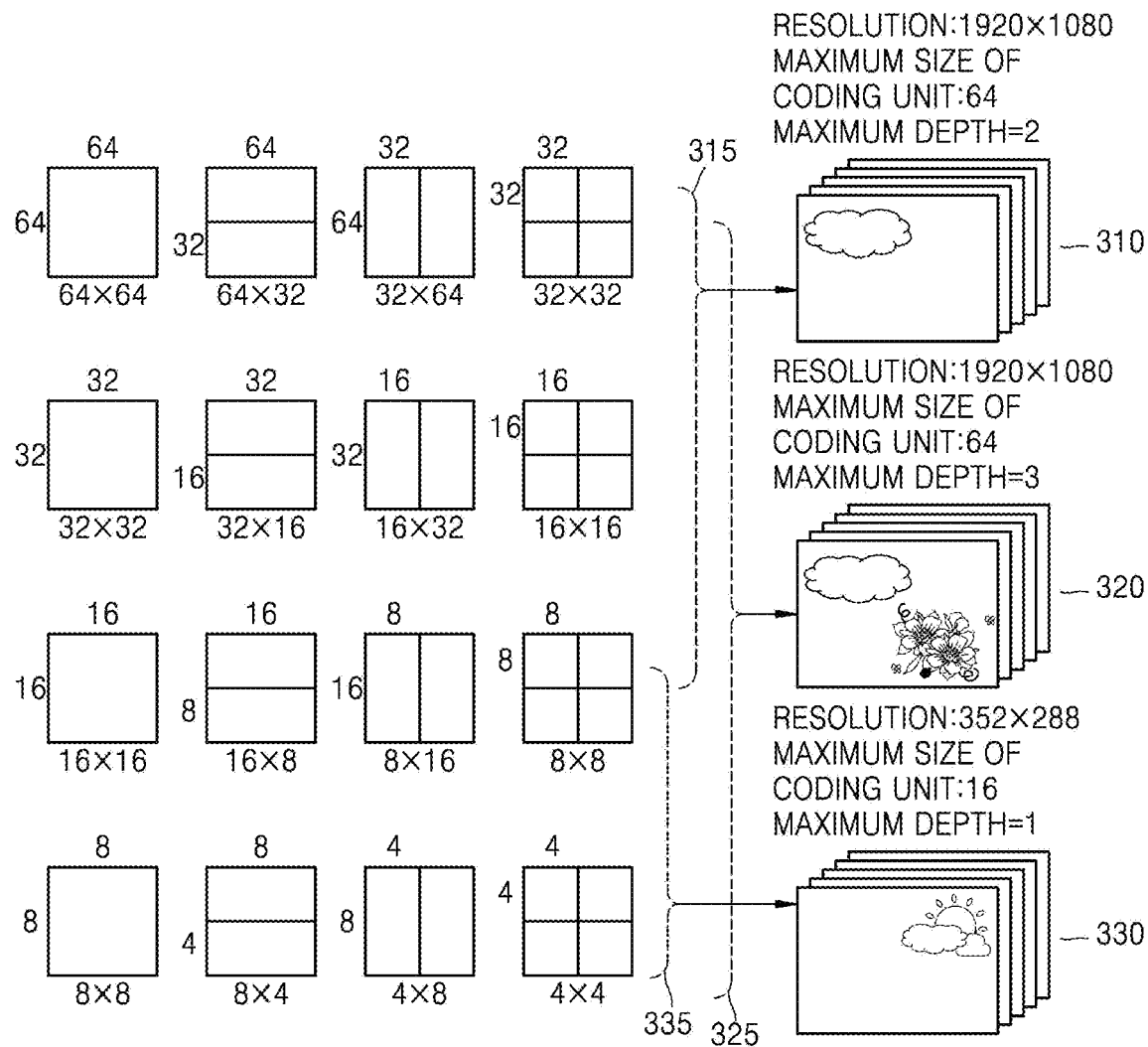
FIG. 10 illustrates a concept of coding units, according to various embodiments.

FIG. 10 is a diagram for describing a concept of coding units according to various embodiments.

A size of a coding unit may be expressed as "width× height," and may be 64×64, 32×32, 16×16, and 8×8, although other dimensions not mentioned here are also possible. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from an LCU to a smallest coding unit.

When a resolution is relatively high or a data amount is relatively large, it is preferable that a maximum size of a coding unit is large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the video data 310 may include an LCU having a long axis size of 64, and coding units having long axis sizes of 32 and 16 since depths are increased to two layers by splitting the LCU twice. On the other hand, since the maximum depth of the video data 330 is 1, coding units 335 of the video data 330 may include an LCU having a long axis size of 16, and coding units having a long axis size of 8 since depths are increased to one layer by splitting the LCU once.

Since the maximum depth of the video data 320 is 3, coding units 325 of the video data 320 may include an LCU having a long axis size of 64, and coding units having long axis sizes of 32, 16, and 8 since the depths are increased to 3 layers by splitting the LCU three times. As a depth increases, detailed information may be precisely expressed.

Figure 11:
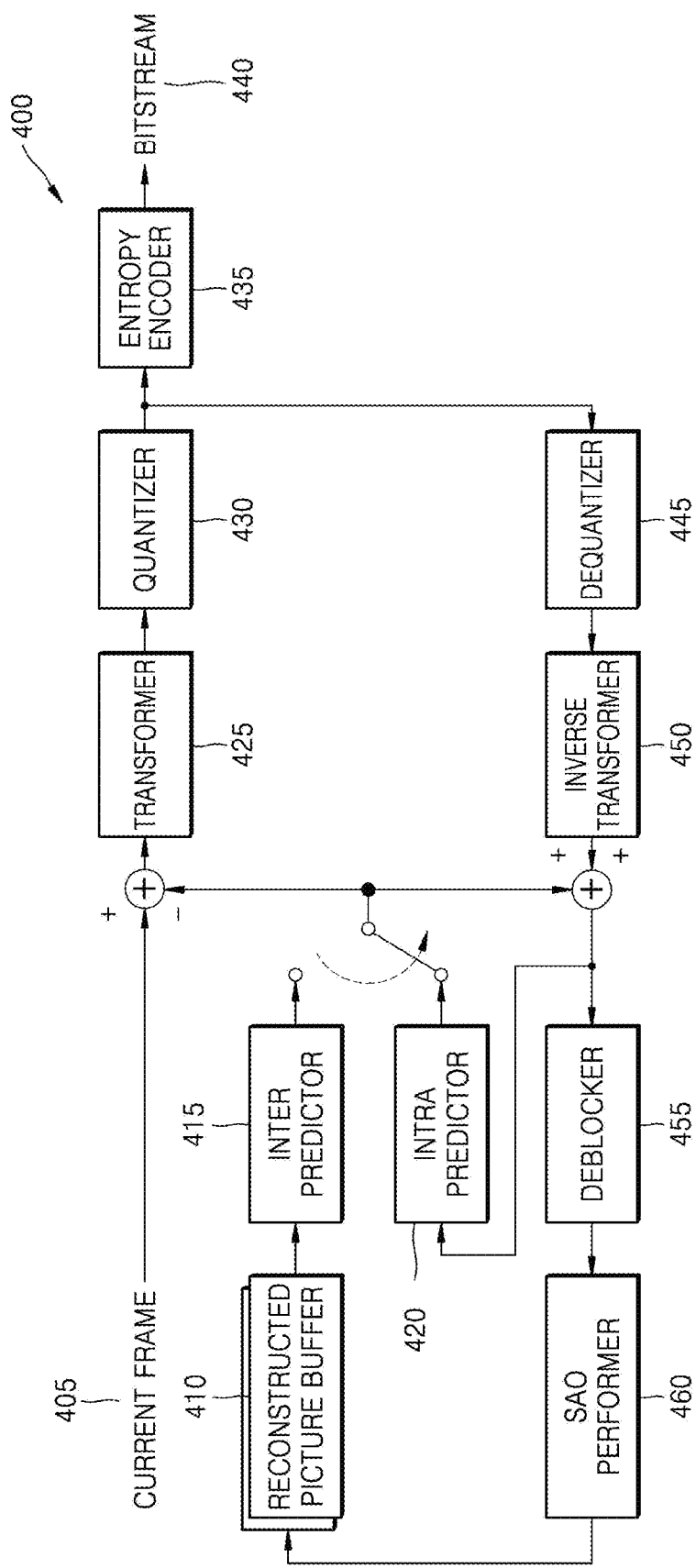
FIG. 11 is a block diagram of an image encoder based on coding units, according to various embodiments.

FIG. 11 is a block diagram of an image encoder 400 based on coding units, according to various embodiments.

The image encoder 400 according to various embodiments performs operations of the video encoding apparatus 100 so as to encode image data. That is, an intra predictor 420 performs intra prediction on coding units in an intra mode, from among a current image 405, per prediction unit, and an inter predictor 415 performs inter prediction on coding units in an inter mode by using the current image 405 and a reference image obtained from a reconstructed picture buffer 410 according to prediction units. The current picture 405 may be split into LCUs, and then the LCUs may be sequentially encoded. In this regard, the LCU that is to be split into coding units having a tree structure may be encoded.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transform unit. The quantized transformation coefficient is reconstructed as the residue data in a spatial domain through an inverse-quantizer 445 and an inverse-transformer 450. The reconstructed residue data in the spatial domain is added to the prediction data of the coding unit of each mode output from the intra predictor 420 or the inter predictor 415 to be reconstructed as data in a spatial domain of the coding unit of the current image 405. The reconstructed data in the spatial domain is generated as a reconstructed image through a deblocking unit 455 and an SAO performer 460. The reconstructed image is stored in the reconstructed picture buffer 410. Reconstructed images stored in the reconstructed picture buffer 410 may be used as a reference image for inter prediction of another image. The transformation coefficient quantized by the transformer 425 and the quantizer 430 may be output as a bitstream 440 through an entropy encoder 435.

In order for the image encoder 400 according to various embodiments to be applied in the video encoding apparatus 100, components of the image encoder 400 (i.e., the inter predictor 415, the intra predictor 420, the transformer 425, the quantizer 430, the entropy encoder 435, the inverse quantizer 445, the inverse transformer 450, the deblocking unit 455, and the SAO performer 460) perform operations based on each coding unit among coding units having a tree structure per LCU.

In particular, the intra predictor 420 and the inter predictor 415 may determine a partition mode and a prediction mode of each coding unit from among the coding units having a tree structure, by taking into account the maximum size and the maximum depth of a current LCU, and the transformer 425 may determine whether to split a transform unit according to a quad tree in each coding unit from among the coding units having a tree structure.

Figure 12:
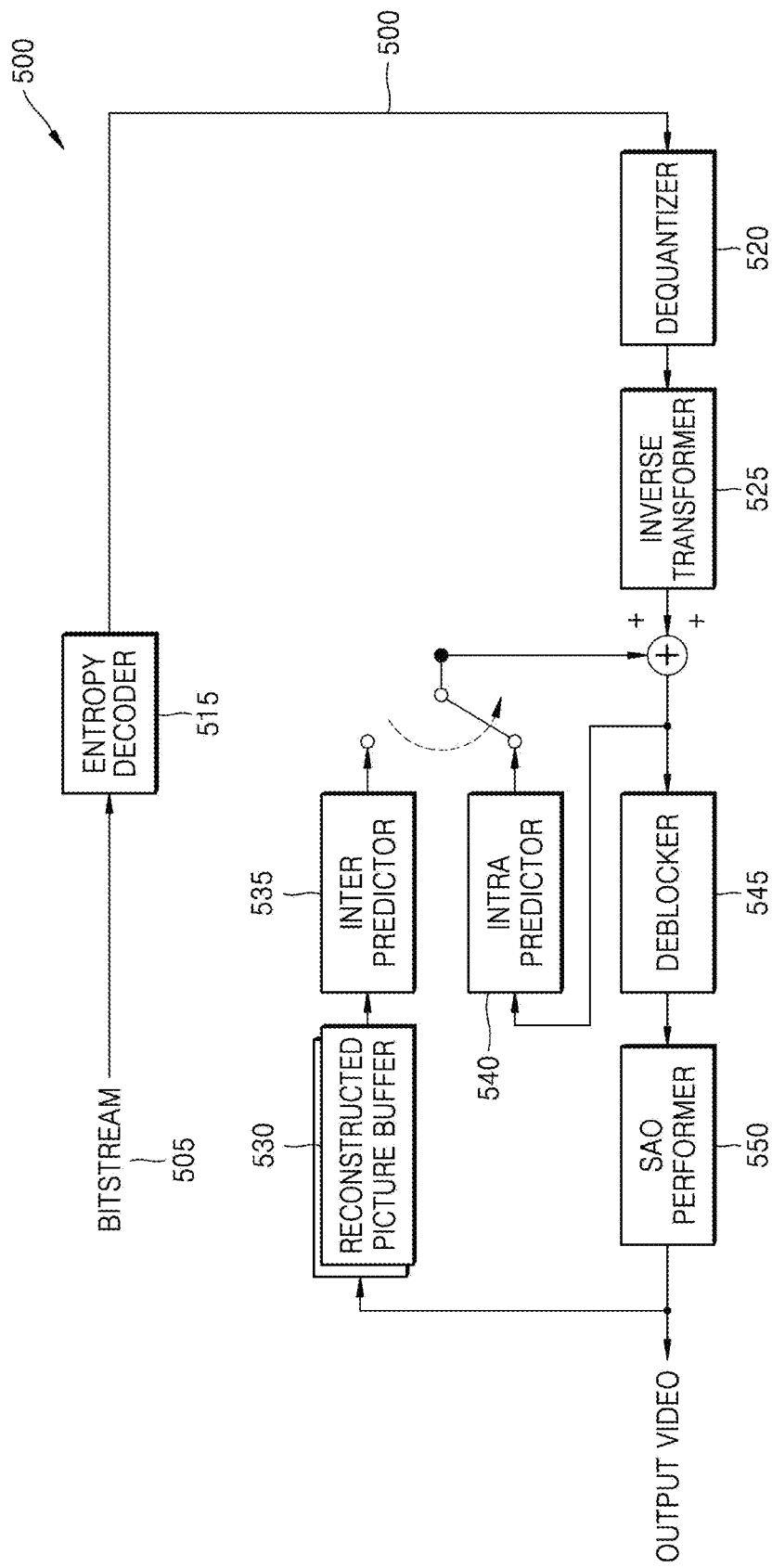
FIG. 12 is a block diagram of an image decoder based on coding units, according to various embodiments.

FIG. 12 illustrates a block diagram of an image decoder 500 based on coding units, according to various embodiments.

An entropy decoder 515 parses, from a bitstream 505, encoded image data to be decoded and encoding information required for decoding. The encoded image data corresponds to a quantized transformation coefficient, and an inverse-quantizer 520 and an inverse-transformer 525 reconstruct residue data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the spatial domain may be output as a reconstructed image 560 through a deblocking unit 545 and an SAO performer 550. Also, reconstructed images that are stored in the reconstructed picture buffer 530 may be output as reference images.

In order for a picture decoder 230 of the video decoding apparatus 200 to decode the image data, operations after the entropy decoder 515 of the image decoder 500 according to various embodiments may be performed.

In order for the image decoder 500 to be applied in the video decoding apparatus 200 according to various embodiments, components of the image decoder 500 (i.e., the entropy decoder 515, the inverse quantizer 520, the inverse transformer 525, the intra predictor 540, the inter predictor 535, the deblocking unit 545, and the SAO performer 550) may perform operations based on coding units having a tree structure for each LCU.

In particular, the intra predictor 540 and the inter predictor 535 may determine a partition mode and a prediction mode of each coding unit from among the coding units according to a tree structure, and the inverse-transformer 525 may determine whether or not to split a transform unit according to a quad-tree structure in each coding unit.

Figure 13:
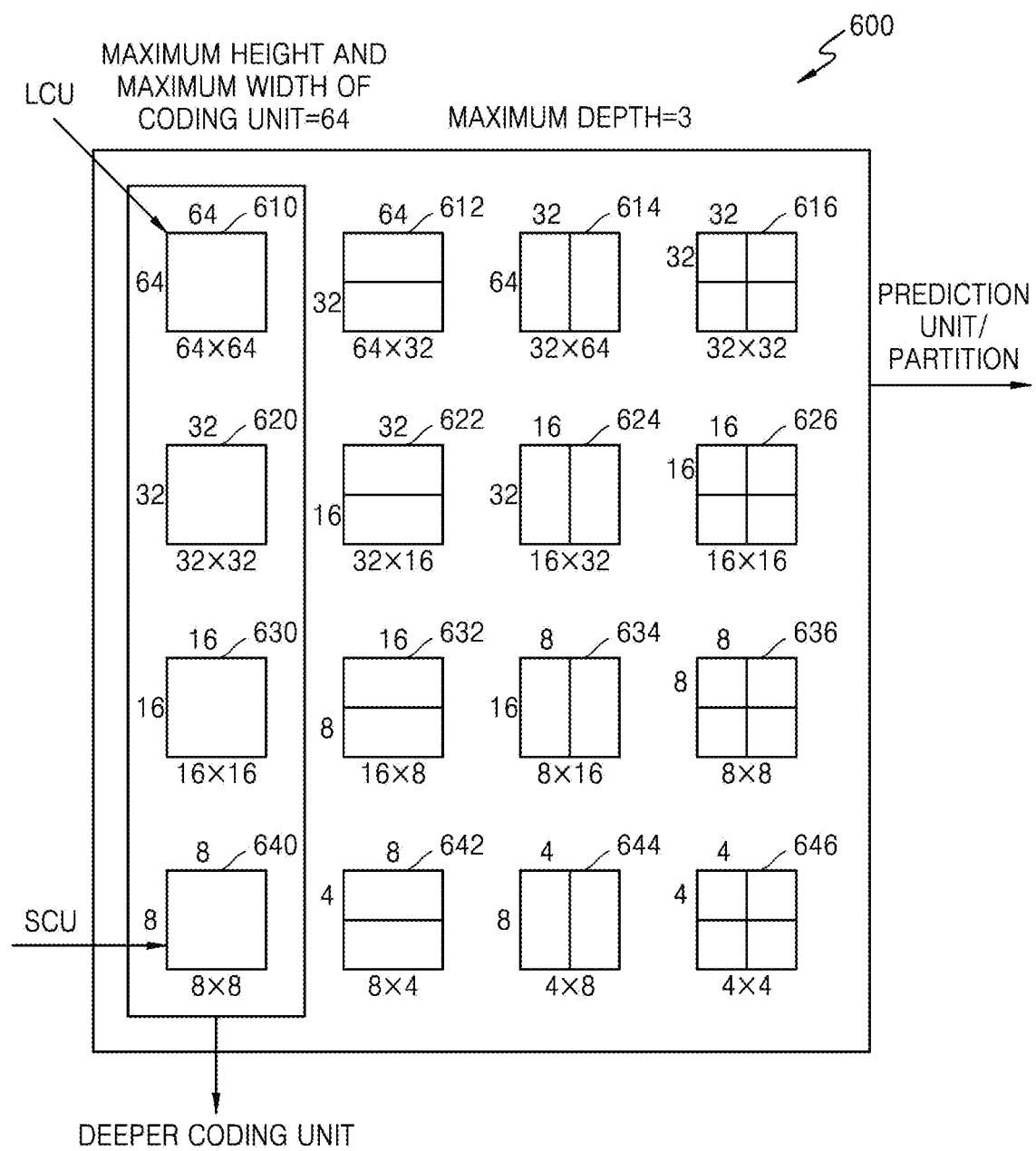
FIG. 13 is a diagram illustrating coding units and partitions, according to various embodiments.

FIG. 13 illustrates coding units according to depths and partitions, according to various embodiments.

The video encoding apparatus 100 according to various embodiments and the video decoding apparatus 200 according to various embodiments use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure 600 of coding units according to various embodiments, the maximum height and the maximum width of the coding units are each 64, and the maximum depth is 3. In this case, the maximum depth refers to a total number of times the coding unit is split from the LCU to the smallest coding unit. Since a depth increases along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is an LCU in the hierarchical structure of coding units 600, wherein a depth is 0 and a size (i.e., height by width) is 64×64. The depth increases along the vertical axis, and a coding unit 620 having a size of 32×32 and a depth of 1, a coding unit 630 having a size of 16×16 and a depth of 2, and a coding unit 640 having a size of 8×8 and a depth of 3 are present. The coding unit 640 having a size of 8×8 and a depth of 3 is a smallest coding unit.

The prediction unit and the partitions of a coding unit are arranged along the horizontal axis according to each depth. That is, when the coding unit 610 having a size of 64×64 and a depth of 0 is a prediction unit, the prediction unit may be split into partitions included in the coding unit 610 having the size of 64×64, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition 640 having a size of 8×8 included in the coding unit 640, partitions 642 having a size of 8×4, partitions 644 having a size of 4×8, and partitions 646 having a size of 4×4.

In order to determine a depth of the LCU 610, the coding unit determiner 120 of the video encoding apparatus 100 has to perform encoding on coding units respectively corresponding to depths included in the LCU 610.

The number of deeper coding units according to depths including data in the same range and the same size increases as the depth increases. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth increases along the vertical axis of the hierarchical structure of coding units 600. A depth and a partition generating the minimum encoding error in the LCU 610 may be selected as a depth and a partition mode of the LCU 610.

Figure 14:
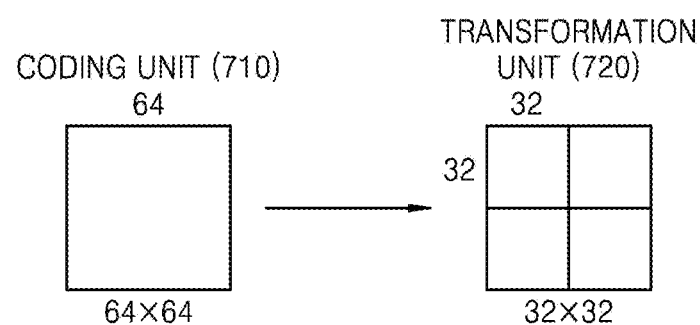
FIG. 14 is a diagram for describing a relationship between a coding unit and transform units, according to various embodiments.

FIG. 14 illustrates a relationship between a coding unit and transform units, according to various embodiments.

The video encoding apparatus 100 according to various embodiments or the video decoding apparatus 200 according to various embodiments encodes or decodes an image according to coding units having sizes less than or equal to an LCU for each LCU. Sizes of transform units for transformation during an encoding process may be selected based on data units that are not larger than a corresponding coding unit.

For example, in the video encoding apparatus 100 according to various embodiments or the video decoding apparatus 200 according to various embodiments, when a size of a coding unit 710 is 64×64, transformation may be performed by using a transform units 720 having a size of 32×32.

Also, data of the coding unit 710 having the size of 64×64 may be encoded by performing the transformation on each of the transform units having the size of 32×32, 16×16, 8×8, and 4×4, which are smaller than 64×64, and then a transform unit having the minimum coding error with respect to an original image may be selected.

Figure 15:
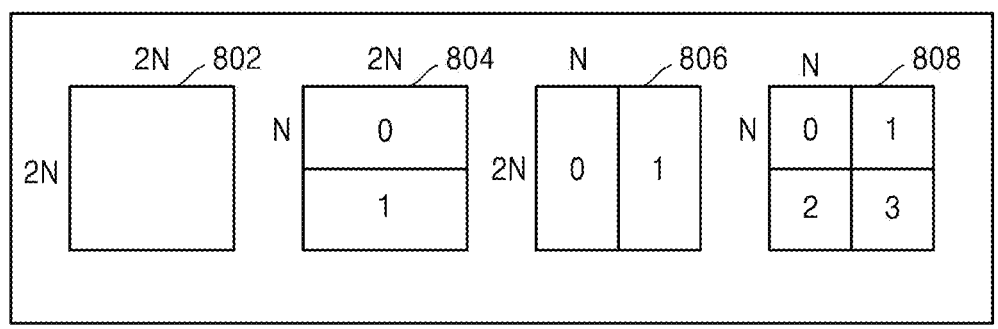
FIG. 15 illustrates a plurality of pieces of encoding information according to an embodiment.
Figure 15:
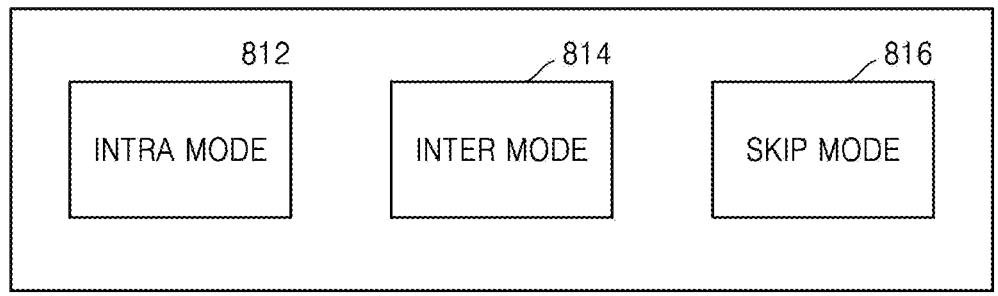
Figure 15:
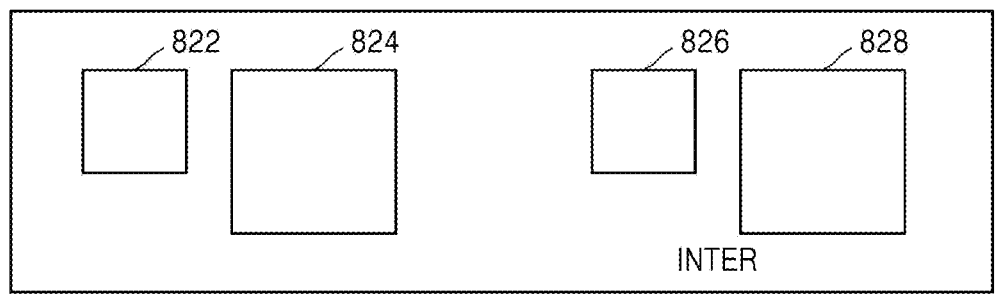

FIG. 15 illustrates a plurality of pieces of encoding information according to various embodiments.

The output unit 130 of the video encoding apparatus 100 according to various embodiments may encode and transmit, as split information, partition mode information 800, prediction mode information 810, and transform unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800 (i.e., an intra mode 812, an inter mode 814, or a skip mode 816).

The transform unit size information 820 represents a transform unit to be based on when transformation is performed on a current coding unit. For example, the transform unit may be one of a first intra transform unit 822, a second intra transform unit 824, a first inter transform unit 826, and a second inter transform unit 828.

The image data and encoding information extractor 220 of the video decoding apparatus 200 may extract and use the partition mode information 800, the prediction mode information 810, and the transform unit size information 820 for each deeper coding unit.

Figure 16:
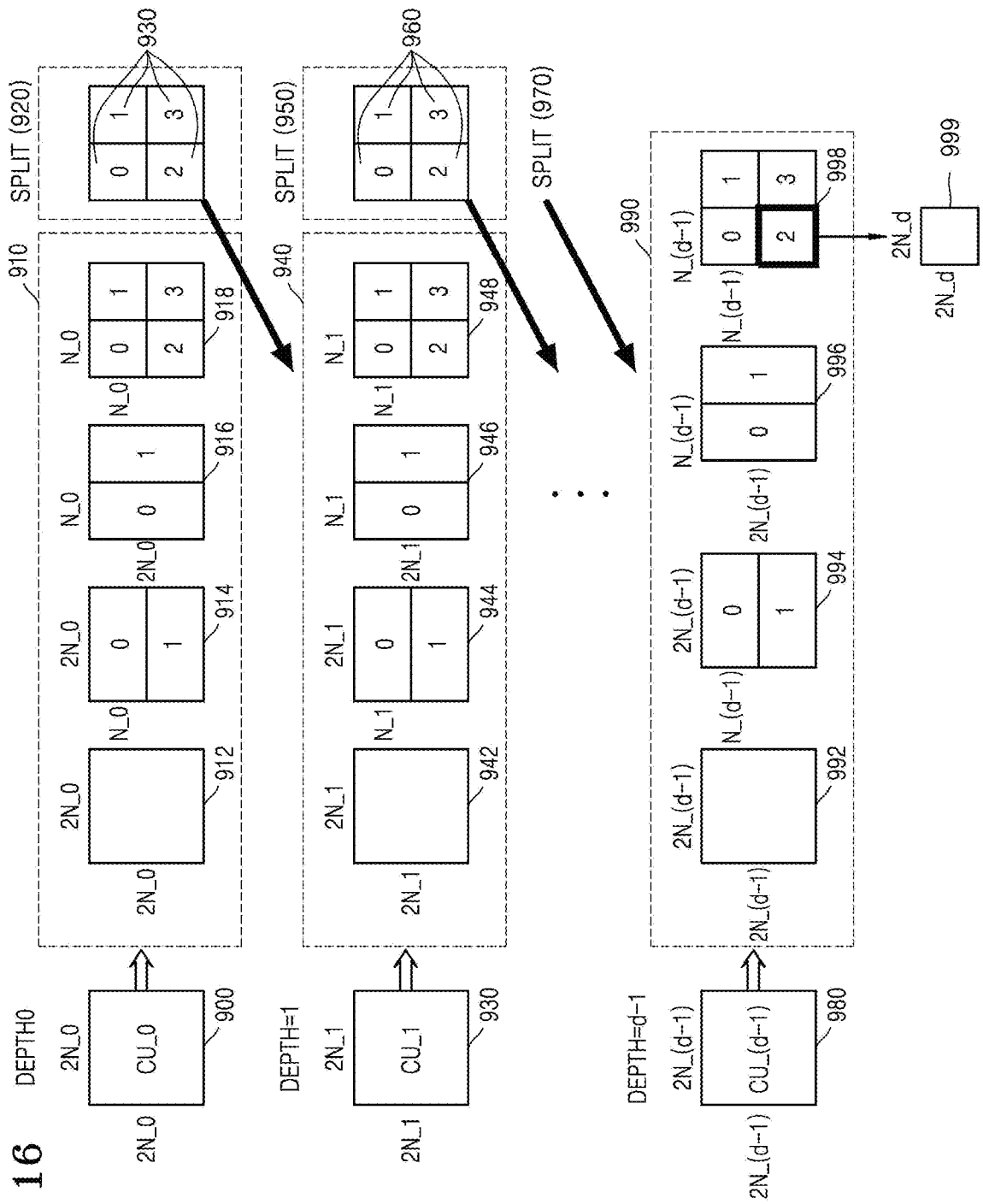
FIG. 16 is a diagram of coding units according to various embodiments.

FIG. 16 illustrates deeper coding units according to depths, according to various embodiments.

Split information may be used to represent a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

When an encoding error is smallest in one of the partition modes 912, 914, and 916 having the sizes of 2N_0×2N_0, 2N_0×N_0 and N_0×2N_0, the prediction unit 910 may not be split into a lower depth.

When the encoding error is the smallest in the partition mode 918 having the size of N_0×N_0, a depth is changed from 0 to 1 and split is performed (operation 920), and encoding may be repeatedly performed on coding units 930 of a partition mode having a depth of 2 and a size of N_0×N_0 so as to search for a minimum encoding error.

A prediction unit 940 for prediction encoding the coding unit 930 having a depth of 1 and a size of 2N_1×2N_1 (=N_0×N_0) may include a partition mode 942 having a size of 2N_1×2N_1, a partition mode 944 having a size of 2N_1×N_1, a partition mode 946 having a size of N_1×2N_1, and a partition mode 948 having a size of N_1×N_1.

When an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum or reduced encoding error.

Even when the partition mode 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current LCU 900 is determined to be d−1 and a partition mode of the current LCU 900 may be determined to be N_(d−1)×N_(d−1). Also, since the maximum depth is d, split information for a coding unit 952 having a depth of d−1 is not set.

A data unit 999 may be a "minimum unit" for the current LCU. A minimum unit according to various embodiments may be a square data unit obtained by splitting a smallest coding unit having a lowermost depth by 4. By performing the encoding repeatedly, the video encoding apparatus 100 according to various embodiments may select a depth generating the minimum encoding error by comparing encoding errors according to depths of the coding unit 900 to determine a depth, and may set a corresponding partition mode and a prediction mode as an encoding mode of the depth.

As such, the minimum encoding errors according to depths are compared in all of the depths of 0, 1, . . . , d−1, d, and a depth having a minimum encoding error may be determined as a depth. The depth, the partition mode of the prediction unit, and the prediction mode may be encoded and transmitted as split information. Also, since a coding unit has to be split from a depth of 0 to a depth, only split information of the depth is set to 0, and split information of depths excluding the depth is set to 1.

The image data and encoding information extractor 220 of the video decoding apparatus 200 according to various embodiments may extract and use a depth and prediction unit information about the coding unit 900 so as to decode the coding unit 912. The video decoding apparatus 200 according to various embodiments may determine a depth, in which split information is 0, as a depth by using split information according to depths, and may use, for decoding, split information about the corresponding depth.

Figure 17:
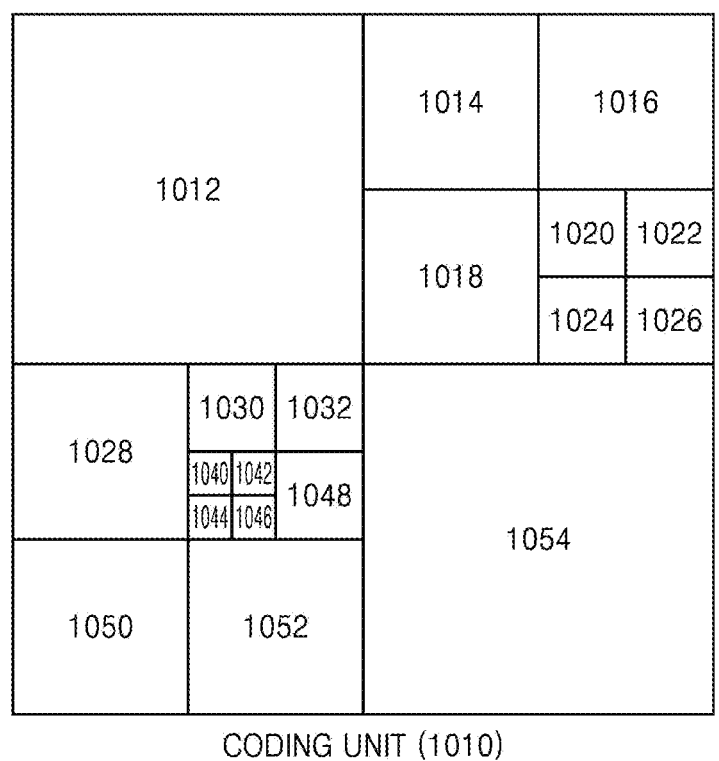
FIGS. 17, 18, and 19 are diagrams for describing a relationship between coding units, prediction units, and transform units, according to various embodiments.
Figure 18:
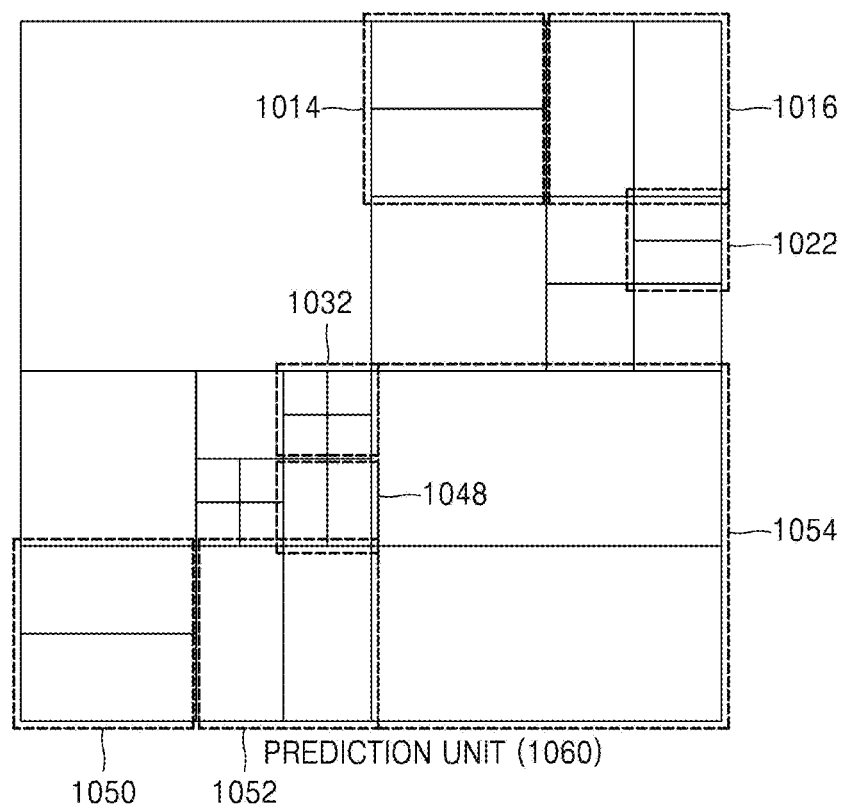
Figure 19:
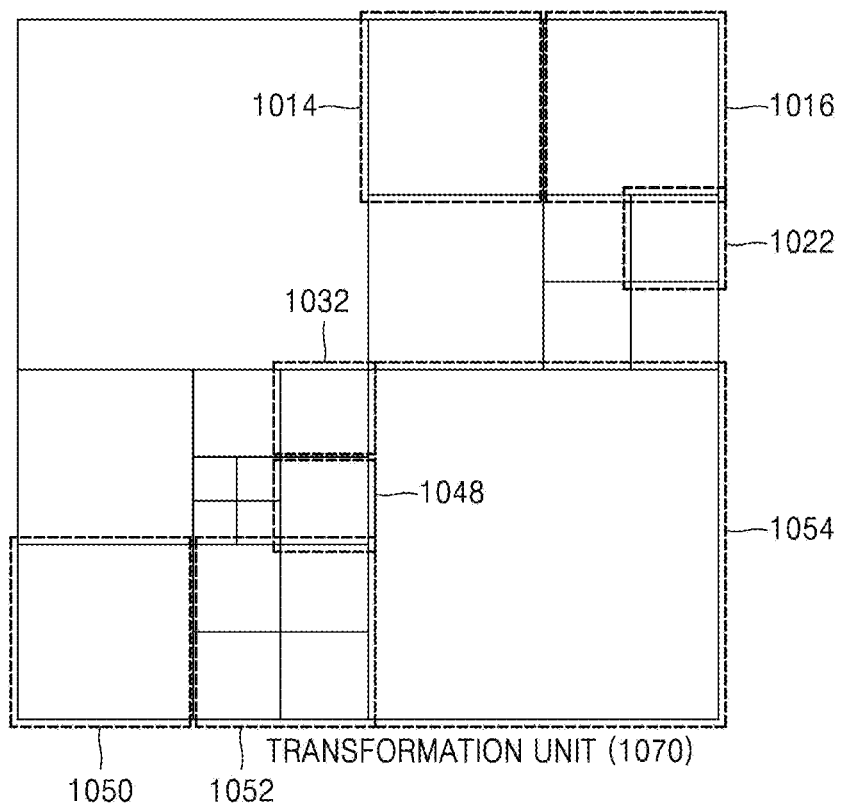

FIGS. 17, 18, and 19 illustrate a relationship between coding units, prediction units, and transform units, according to various embodiments.

Coding units 1010 are deeper coding units according to depths determined by the video encoding apparatus 100, in an LCU. Prediction units 1060 are partitions of prediction units of each of the coding units 1010 according to depths, and transform units 1070 are transform units of each of the coding units according to depths.

When a depth of an LCU is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transform units 1070 in a data unit that is smaller than the coding unit 1052. Also, the coding units 1014, 1016, 1022, 1032, 1048, 1050, 1052, and 1054 in the transform units 1760 are data units different from those in the Prediction units 1060 in terms of sizes and shapes. That is, the video encoding apparatus 100 and the video decoding apparatus 200 according to various embodiments may perform intra prediction, motion estimation, motion compensation, and/or transformation/inverse transformation on an individual data unit in the same coding unit.

Accordingly, encoding is recursively performed on each of coding units having a hierarchical structure in each region of an LCU so as to determine an optimum coding unit, and thus coding units according to a recursive tree structure may be obtained. Encoding information may include split information about a coding unit, partition mode information, prediction mode information, and transform unit size information. Table 1 below shows the encoding information that may be set by the video encoding apparatus 100 and the video decoding apparatus 200 according to various embodiments.

TABLE 1

Split Information 0
(Encoding on Coding Unit having Size of 2N × 2N and Current Depth of d)

| | Partition Mode | | Size of Transform unit | | |
| --- | --- | --- | --- | --- | --- |
| Prediction Mode | Symmetrical Partition Mode | Asymmetrical Partition Mode | Split Information 0 of Transform unit | Split Information 1 of Transform unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Mode) N/2 × N/2 (Asymmetrical Partition Mode) | Repeatedly Encode Coding Units having Lower Depth of d + 1 |

The output unit 130 of the video encoding apparatus 100 according to various embodiments may output the encoding information about the coding units having a tree structure, and the image data and encoding information extractor 220 of the video decoding apparatus 200 according to various embodiments may extract the encoding information about the coding units having a tree structure from a received bitstream.

Split information indicates whether a current coding unit is split into coding units of a lower depth. When split information of a current depth d is 0, a depth, in which a current coding unit is no longer split into a lower depth, is a final depth, and thus partition mode information, a prediction mode, and transform unit size information may be defined for the depth. When the current coding unit has to be further split according to the split information, encoding has to be independently performed on each of four split coding units of a lower depth.

The prediction mode may be one of an intra mode, an inter mode, and a skip mode. The intra mode and the inter mode may be defined in all partition modes, and the skip mode may be defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transform unit may be set to be two types in the intra mode and two types in the inter mode. That is, when split information of the transform unit is 0, the size of the transform unit may be 2N×2N, which is the size of the current coding unit. When split information of the transform unit is 1, the transform units may be obtained by splitting the current coding unit. Also, when a partition mode of the current coding unit having the size of 2N×2N is a symmetrical partition mode, a size of a transform unit may be N×N, and when the partition mode of the current coding unit is an asymmetrical partition mode, the size of the transform unit may be N/2×N/2.

The encoding information about coding units having a tree structure according to various embodiments may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the coding unit corresponding to the same depth by comparing a plurality of pieces of encoding information of the adjacent data units. Also, a corresponding coding unit corresponding to a depth is determined by using encoding information of a data unit, and thus a distribution of depths in an LCU may be inferred.

Accordingly, when a current coding unit is predicted based on adjacent data units, encoding information of data units in deeper coding units adjacent to the current coding unit may be directly referred to and used.

In another embodiment, when a current coding unit is prediction-encoded based on adjacent data units, the adjacent data units may be referred to in a manner that data adjacent to the current coding unit is searched for in deeper coding units by using encoding information of the deeper coding units adjacent to the current coding unit.

Figure 20:
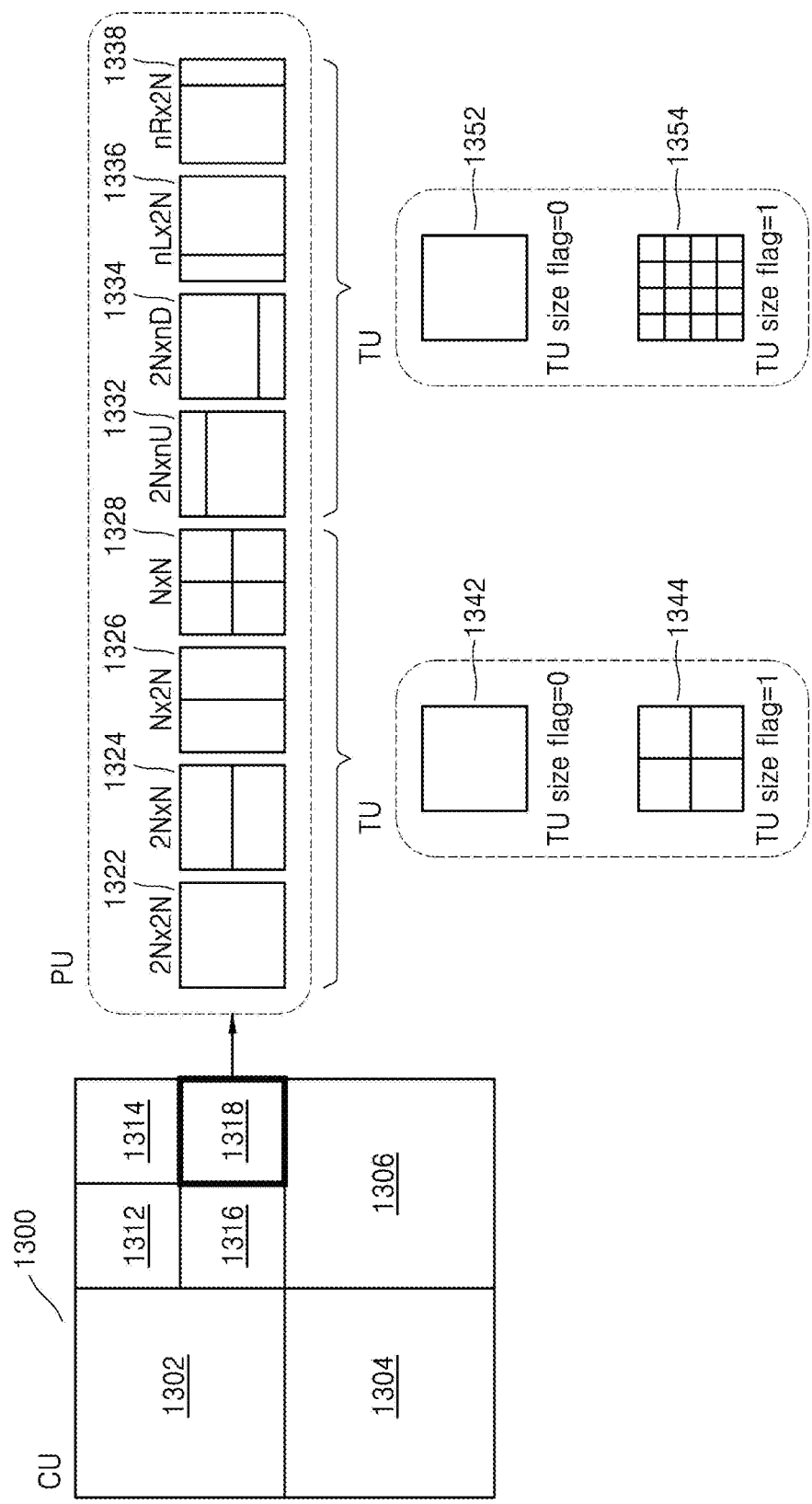
FIG. 20 illustrates a relationship between a coding unit, a prediction unit, and a transform unit, according to encoding mode information of Table 1.

FIG. 20 illustrates a relationship between a coding unit, a prediction unit, and a transform unit, according to encoding mode information of Table 1.

An LCU 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transform unit split information (TU size flag) is a type of a transformation index, and a size of a transform unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, when the transform unit split information is 0, a transform unit 1342 having a size of 2N×2N is set, and when the transform unit split information is 1, a transform unit 1344 having a size of N×N may be set.

When the partition mode information is set to be one of asymmetrical partition modes 2N×nU 1332, 2N×nD 1334, nL×2N 1336, and nR×2N 1338, when the transform unit split information (TU size flag) is 0, a transform unit 1352 having a size of 2N×2N may be set, and when the transform unit split information is 1, a transform unit 1354 having a size of N/2×N/2 may be set.

The transform unit split information (TU size flag) described above with reference to FIG. 20 is a flag having a value of 0 or 1, but the transform unit split information according to an embodiment is not limited to a flag having 1 bit, and the transform unit may be hierarchically split while the transform unit split information increases (e.g., 0, 1, 2, 3, etc.) according to a predetermined setting. The transform unit split information may be an example of the transformation index.

In this case, the size of a transform unit that has been actually used may be expressed by using the transform unit split information according to various embodiments, together with a maximum size of the transform unit and a minimum size of the transform unit. The video encoding apparatus 100 according to various embodiments may encode maximum transform unit size information, minimum transform unit size information, and maximum transform unit split information. The result of encoding the maximum transform unit size information, the minimum transform unit size information, and the maximum transform unit split information may be inserted into a sequence parameter set (SPS). The video decoding apparatus 200 according to various embodiments may decode video by using the maximum transform unit size information, the minimum transform unit size information, and the maximum TU size flag.

For example, (a) when the size of a current coding unit is 64×64 and a maximum transform unit size is 32×32, (a-1) then the size of a transform unit may be 32×32 when a TU size flag is 0, (a-2) may be 16×16 when the TU size flag is 1, and (a-3) may be 8×8 when the TU size flag is 2.

As another example, (b) when the size of the current coding unit is 32×32 and a minimum transform unit size is 32×32, (b-1) then the size of the transform unit may be 32×32 when the TU size flag is 0. Here, the TU size flag cannot be set to a value other than 0, since the size of the transform unit cannot be less than 32×32.

As another example, (c) when the size of the current coding unit is 64×64 and a maximum TU size flag is 1, then the TU size flag may be 0 or 1. Here, the TU size flag cannot be set to a value other than 0 or 1.

Thus, when it is defined that the maximum TU size flag is MaxTransformSizeIndex, a minimum transform unit size is MinTransformSize, and a transform unit size is RootTuSize when the TU size flag is 0, then a current minimum transform unit size CurrMinTuSize that can be determined in a current coding unit may be defined by Equation 2:

$$\text{CurrMinTuSize} = \max(\text{MinTransformSize}, \text{RootTuSize}/(2^{\text{MaxTransformSizeIndex}})) \quad \text{[Equation 2]}$$

Compared to the current minimum transform unit size CurrMinTuSize that can be determined in the current coding unit, a transform unit size RootTuSize when the TU size flag is 0 may denote a maximum transform unit size that can be selected in the system. In Equation 2, RootTuSize/(2^MaxTransformSizeIndex) denotes a transform unit size when the transform unit size RootTuSize, when the TU size flag is 0, is split by the number of times corresponding to the maximum TU size flag, and MinTransformSize denotes a minimum transformation size. Thus, a smaller value from among RootTuSize/(2^MaxTransformSizeIndex) and MinTransformSize may be the current minimum transform unit size CurrMinTuSize that can be determined in the current coding unit.

According to various embodiments, the maximum transform unit size RootTuSize may vary according to the type of a prediction mode.

For example, when a current prediction mode is an inter mode, then 'RootTuSize' may be determined by using Equation 3 below. In Equation 3, MaxTransformSize denotes a maximum transform unit size, and PUSize denotes a current prediction unit size.

$$\text{RootTuSize} = \min(\text{MaxTransformSize}, \text{PUSize}) \quad \text{[Equation 3]}$$

That is, when the current prediction mode is the inter mode, the transform unit size RootTuSize, when the TU size flag is 0, may be a smaller value from among the maximum transform unit size and the current prediction unit size.

When a prediction mode of a current partition unit is an intra mode, RootTuSize may be determined by using Equation 4 below. PartitionSize denotes the size of the current partition unit.

$$\text{RootTuSize} = \min(\text{MaxTransformSize}, \text{PartitionSize}) \quad \text{[Equation 4]}$$

That is, when the current prediction mode is the intra mode, the transform unit size RootTuSize when the TU size flag is 0 may be a smaller value from among the maximum transform unit size and the size of the current partition unit.

However, the current maximum transform unit size RootTuSize that varies according to the type of a prediction mode in a partition unit is just an example and the present disclosure is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each LCU according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a non-transitory computer-readable recording medium. Examples of the non-transitory computer-readable recording medium include magnetic storage media (e.g., hard disks, etc.), optical recording media (e.g., compact disc read-only memory (CD-ROM), digital versatile disc (DVD), Universal Serial Bus (USB), solid-state drive (SSD), etc.), or the like.

For convenience of description, the image encoding method and/or the video encoding method, which are described with reference to FIGS. 1 through 20, will be collectively referred to as "the video encoding method." In addition, the image decoding method and/or the video decoding method, which are described with reference to FIGS. 1 through 20, will be collectively referred to as "the video decoding method."

Also, a video encoding apparatus including the image encoding apparatus 10, the video encoding apparatus 100, or the image encoder 400 which are described with reference to FIGS. 1 through 20 will be collectively referred to as a "video encoding apparatus of the present disclosure." Also, a video decoding apparatus including the image decoding apparatus 30, the video decoding apparatus 200, or the image decoder 500 which are described with reference to FIGS. 1 through 20 will be collectively referred to as a "video decoding apparatus of the present disclosure."

A non-transitory computer-readable recording medium such as a disc 26000 that stores the programs according to various embodiments will now be described in detail.

Figure 21:
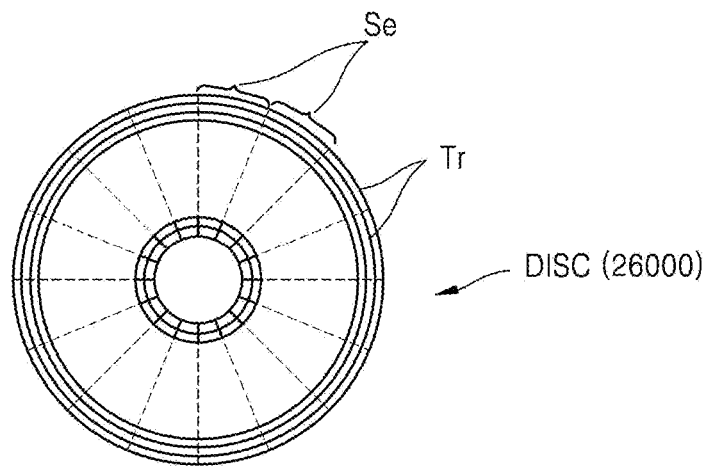
FIG. 21 illustrates a physical structure of a disc in which a program is stored, according to various embodiments.

FIG. 21 illustrates a physical structure of the disc 26000 in which a program is stored, according to various embodiments. The disc 26000, which is a storage medium, may be a hard drive, a CD-ROM, a Blu-ray disc, or a DVD. The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
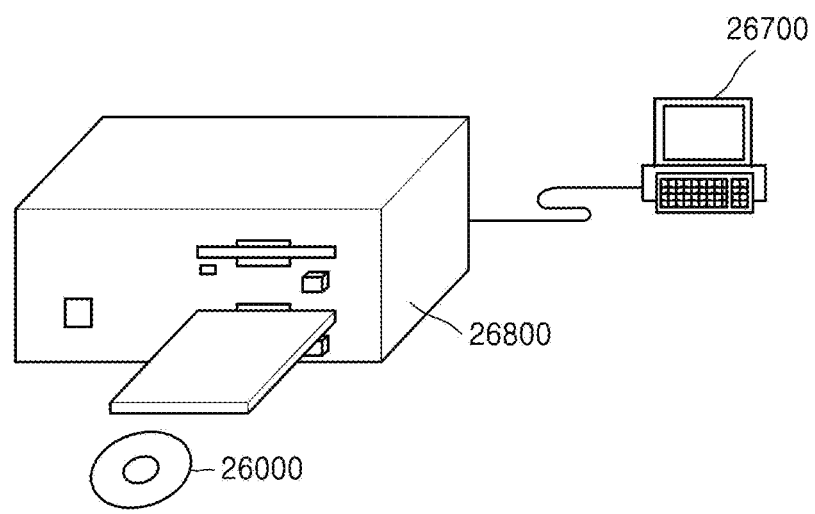
FIG. 22 illustrates a disc drive for recording and reading a program by using the disc.

FIG. 22 illustrates a disc drive 26800 for recording and reading a program by using the disc 26000. A computer system 27000 may store a program that executes at least one of the video encoding method and the video decoding method of the present disclosure, in the disc 26000 via the disc drive 26800. In order to run the program stored in the disc 26000 in the computer system 26700, the program may be read from the disc 26000 and may be transmitted to the computer system 26700 by using the disc drive 26800.

The program that executes at least one of the video encoding method and the video decoding method of the present disclosure may be stored not only in the disc 26000 illustrated in FIGS. 21 and 22 but may also be stored in a memory card, a read-only memory (ROM) cassette, or an SSD.

A system to which the video encoding method and the video decoding method according to the embodiments described above are applied will be described below.

Figure 23:
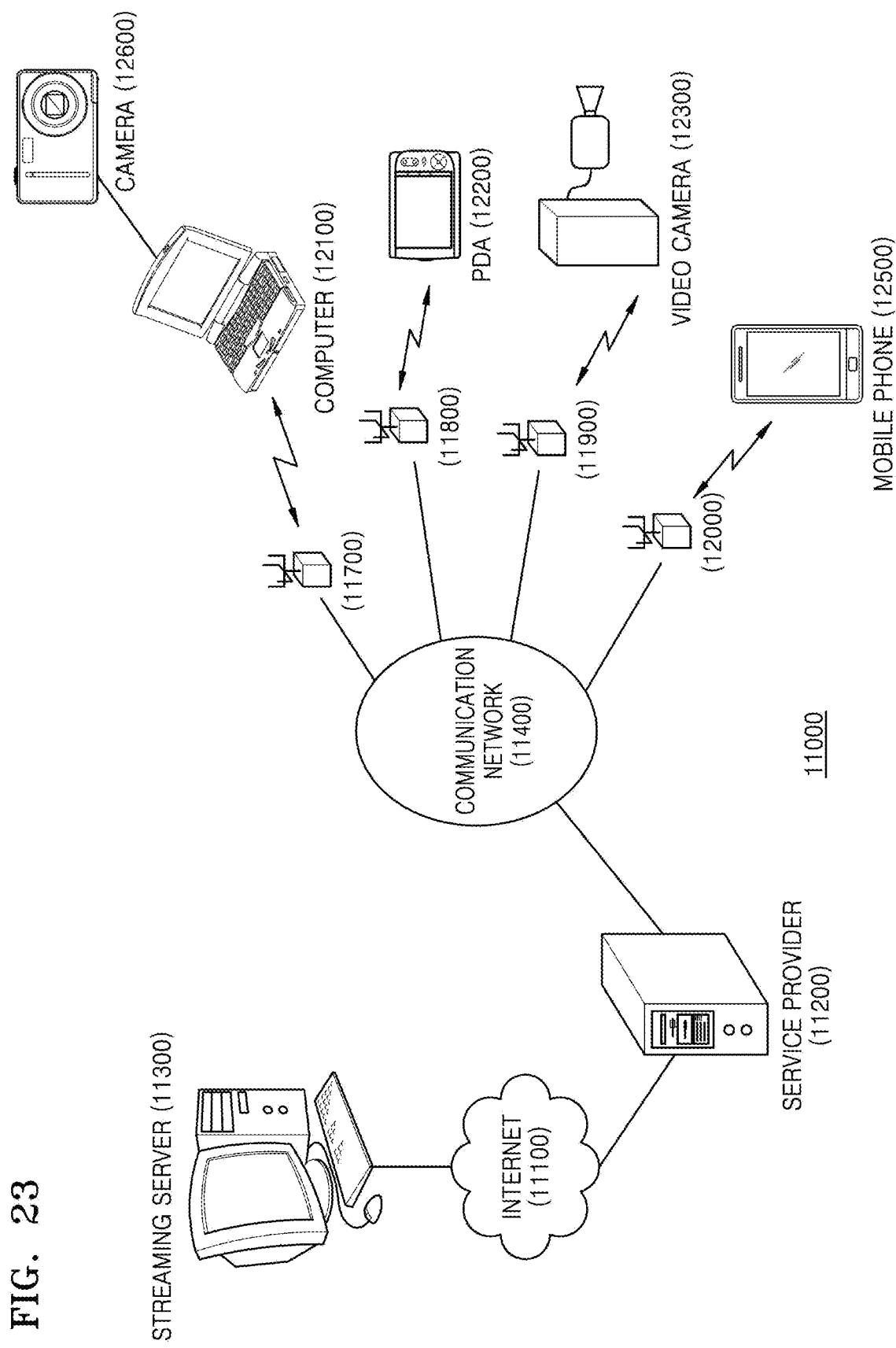
FIG. 23 illustrates an overall structure of a content supply system for providing a content distribution service.

FIG. 23 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
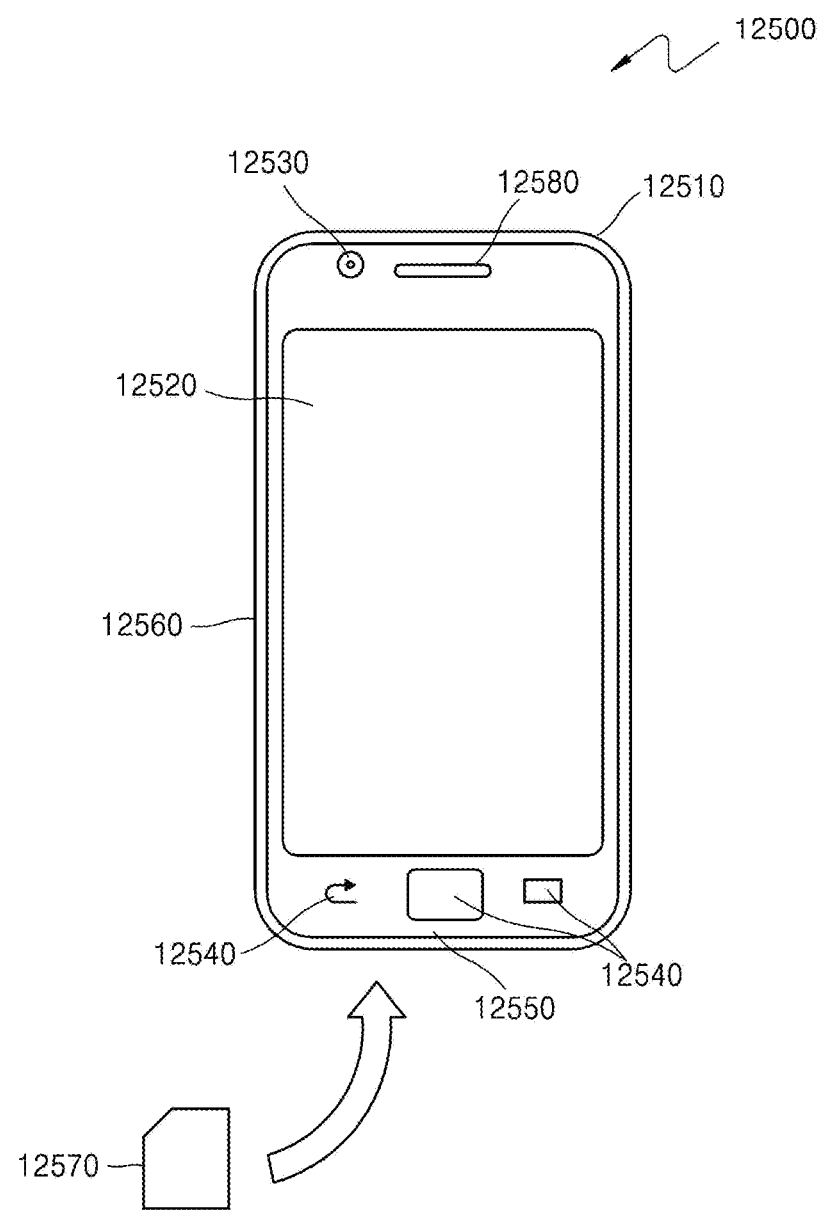
FIGS. 24 and 25 illustrate external and internal structures of a mobile phone to which a video encoding method and a video decoding method are applied, according to various embodiments.

However, the content supply system 11000 is not limited to the structure as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 such as a digital camera is an imaging device capable of capturing both still images and video images. The video data captured by the camera 12600 may be encoded by using the camera 12600 or the computer 12100. Software that performs encoding and decoding video may be stored in a non-transitory computer-readable recording medium, e.g., a CD-ROM disc, a floppy disc, a hard disc drive, an SSD, or a memory card, which may be accessed by the computer 12100.

When video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

In the content supply system 11000 according to various embodiments, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and to decode and reproduce the encoded content data in real-time, thereby enabling personal broadcasting.

The video encoding apparatus and the video decoding apparatus of the present disclosure may be applied to encoding and decoding operations of the plurality of independent devices included in the content supply system 11000.

Figure 25:
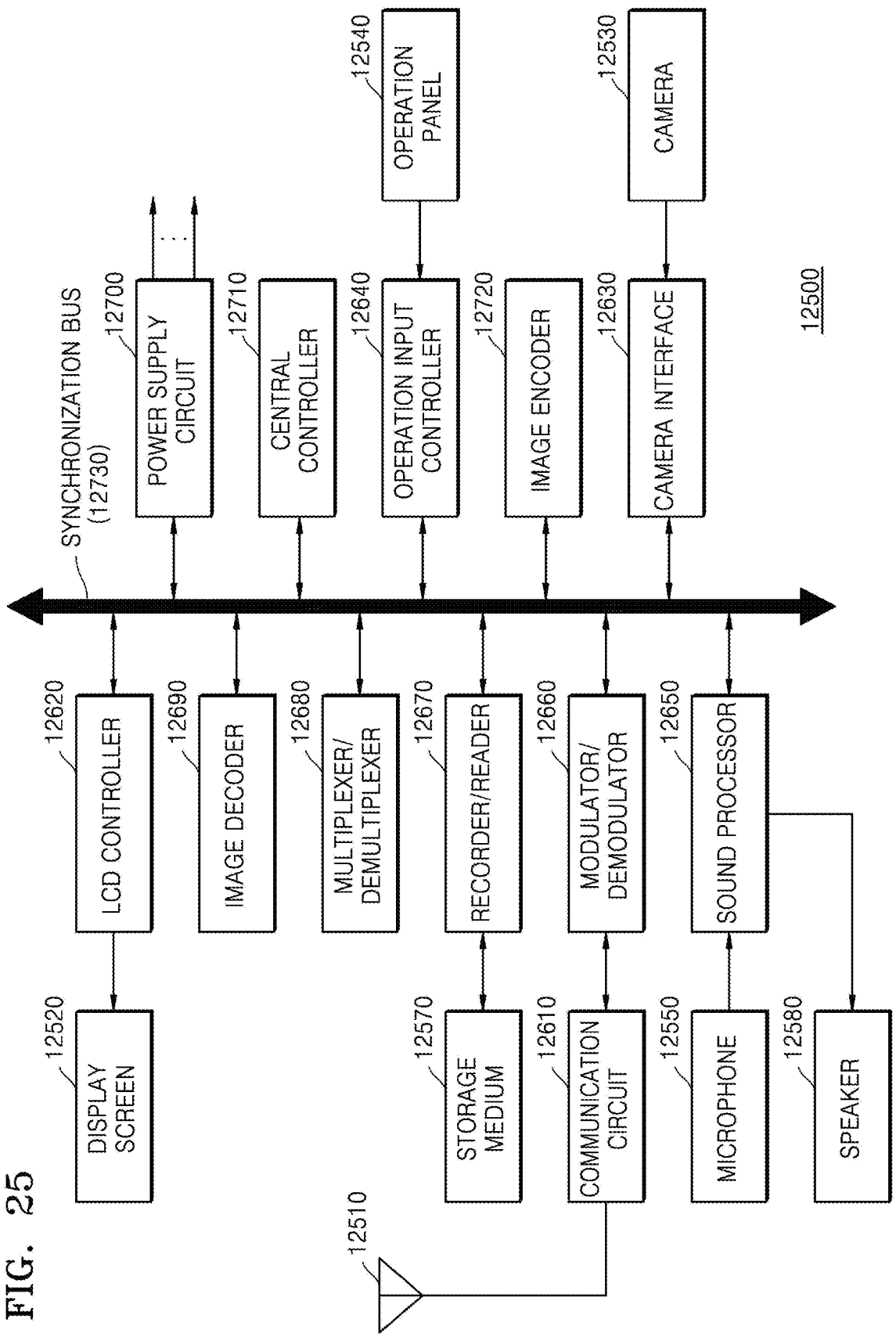

With reference to FIGS. 24 and 25, the mobile phone 12500 included in the content supply system 11000 according to an embodiment will now be described in detail.

FIG. 24 illustrates an external structure of the mobile phone 12500 to which the video encoding method and the video decoding method of the present disclosure are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. When the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read-only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

When a user operates a power button and sets from a "power off" state to a "power on" state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by the control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650 by the control of the central controller 12710. The generated digital sound signal may be converted to a transmission signal through the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. By the control of the central controller 12610, the text data is transformed into a transmission signal via the modulation/demodulation unit 12660 and the communication circuit 12610 and is transmitted to the wireless base station 12000 via the antenna 12510.

In order to transmit image data in the data communication mode, image data captured by the camera 12530 is provided to the image encoder 12720 via the camera interface 12630. The image data captured by the camera 12530 may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 so as to convert the received signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is converted to an analog sound signal via the modulation/demodulation unit 12660 and the sound processor 12650, and the analog sound signal is output via the speaker 12580 by the control of the central controller 12710.

When, in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus 200 described above. The image decoder 12690 may decode the encoded video data to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present disclosure, may be a transmitting terminal including only the video encoding apparatus, or may be a receiving terminal including only the video decoding apparatus.

Figure 26:
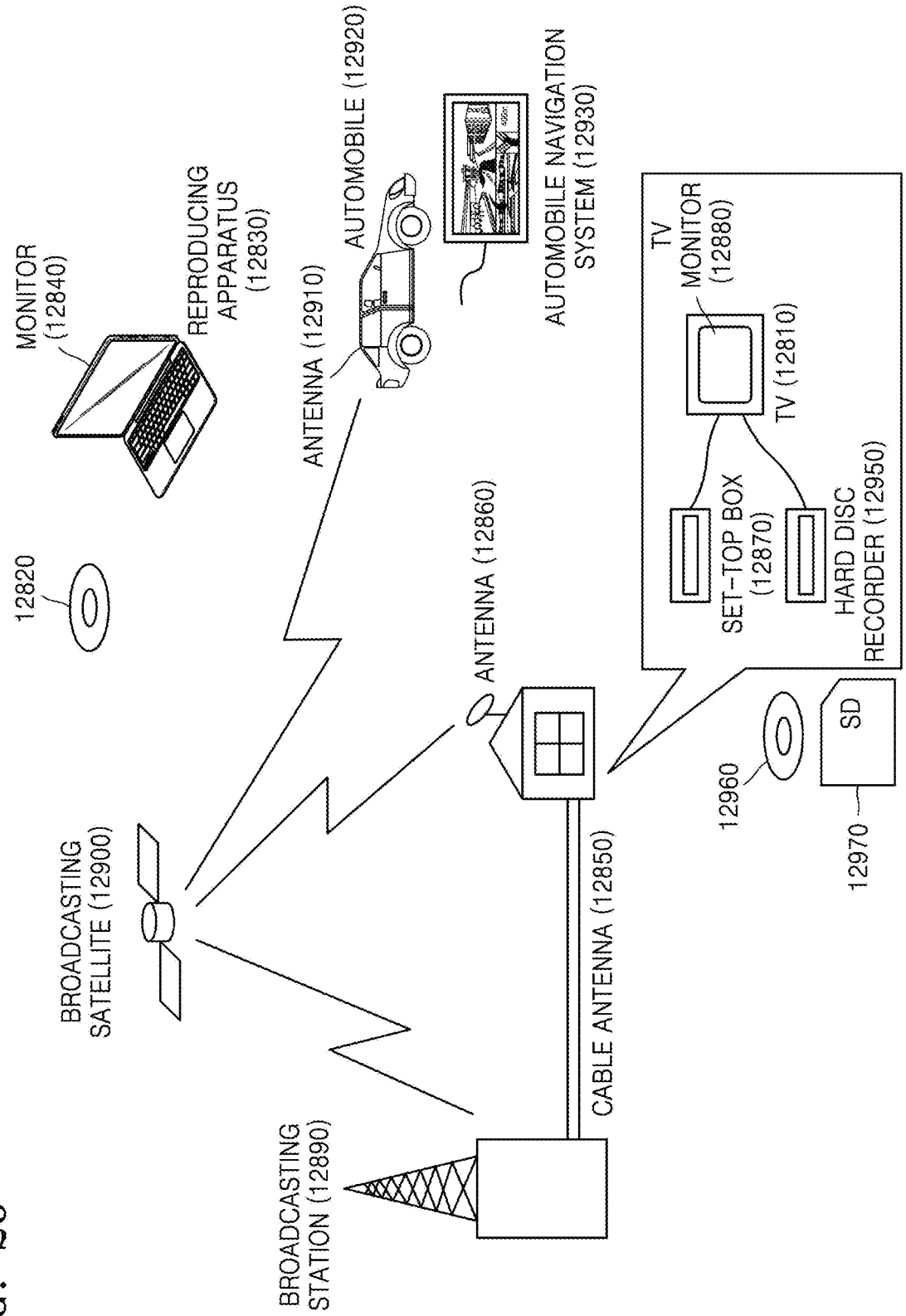
FIG. 26 is a diagram of a digital broadcasting system to which a communication system according to the present disclosure is applied.

A communication system according to the present disclosure is not limited to the communication system described above with reference to FIG. 24. For example, FIG. 26 illustrates a digital broadcasting system employing a communication system, according to various embodiments. The digital broadcasting system of FIG. 26 according to various embodiments may receive a digital broadcast transmitted via a satellite or a terrestrial network by using the video encoding apparatus and the video decoding apparatus of the present disclosure.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present disclosure may be installed. Data output from the set-top box 12870 may also be reproduced on a TV monitor 12880.

As another example, the video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present disclosure and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. When the hard disc recorder 12950 includes the video decoding apparatus of the present disclosure according to various embodiments, a video signal recorded on the DVD disc 12960, the SD card 12970, or another storage medium may be reproduced on the monitor 12880.

The automobile navigation system 12930 may not include the camera 12530, the camera interface 12630, and the image encoder 12720 of FIG. 26. For example, the computer 12100 and the TV receiver 12810 may not include the camera 12530, the camera interface 12630, and the image encoder 12720 of FIG. 26.

Figure 27:
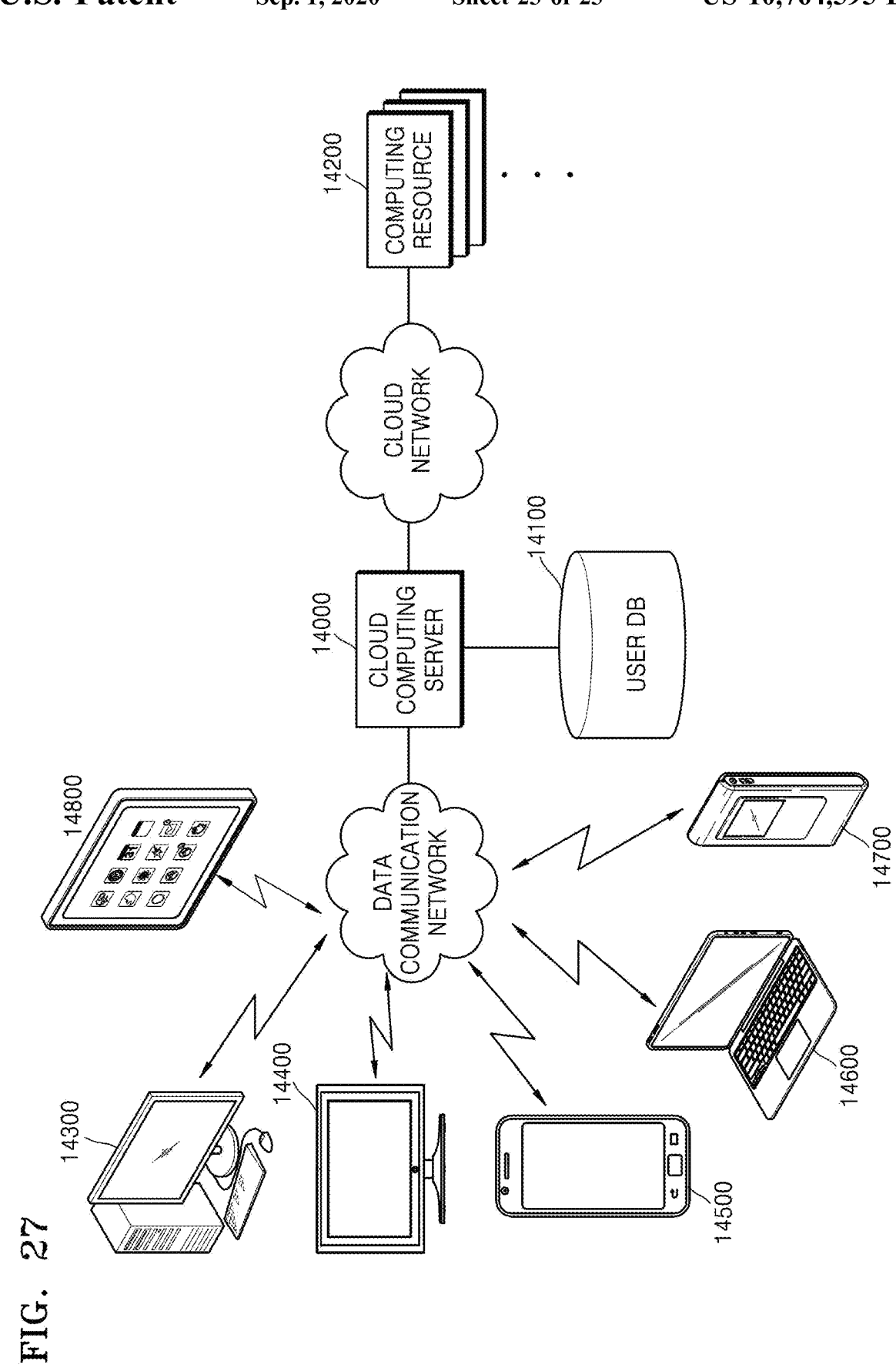
FIG. 27 illustrates a network structure of a cloud computing system using a video encoding apparatus and a video decoding apparatus, according to various embodiments.

FIG. 27 illustrates a network structure of a cloud computing system using the video encoding apparatus and the video decoding apparatus, according to various embodiments.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop personal computer (PC) 14300, a smart TV 14400, a smart phone 14500, a notebook computer 14600, a portable multimedia player (PMP) 14700, a tablet PC 14100, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. When this video was being reproduced, then a method of streaming this video, performed by the cloud computing server 14000, may vary according to the request from the user terminal, i.e., according to whether the video will be reproduced, starting from a start thereof or a pausing point thereof. For example, when the user terminal requests to reproduce the video, starting from the start thereof, the cloud computing server 14000 transmits streaming data of the video starting from a first frame thereof to the user terminal. When the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus of the present disclosure as described above with reference to FIGS. 1 through 20. As another example, the user terminal may include the video encoding apparatus of the present disclosure as described above with reference to FIGS. 1 through 20. Alternatively, the user terminal may include both the video decoding apparatus and the video encoding apparatus as described above with reference to FIGS. 1 through 20.

Various applications of the video encoding method, the video decoding method, the video encoding apparatus, and the video decoding apparatus described above with reference to FIGS. 1 through 20 have been described with reference to FIGS. 21 through 27. However, various embodiments of methods of storing the video encoding method and the video decoding method in a storage medium or various embodiments of methods of implementing the video encoding apparatus and the video decoding apparatus in a device described above with reference to FIGS. 1 through 20 are not limited to the embodiments of FIGS. 21 through 27.

It is obvious to one of ordinary skill in the art that the present disclosure may be easily embodied in many different forms without changing the technical concept or essential features of the disclosure. Thus, it should be understood that the embodiments described herein should be considered in a descriptive sense only and not for purposes of limitation. For example, configuring elements that are singular forms may be executed in a distributed fashion, and also, configuring elements that are distributed may be combined and then executed.

While one or more embodiments have been described with reference to the figures, it will be understood by those of ordinary skill in the art that various changes in form and details may be made therein without departing from the spirit and scope as defined by the following claims.

What is claimed is:

1. An image encoding method comprising:
   extracting feature points from a picture;
   generating at least two clusters by performing feature point clustering on the extracted feature points;
   determining at least two split sections in the picture, the at least two split sections respectively corresponding to the at least two clusters, wherein each split section is configured of at least one block;
   parallel-encoding the at least two split sections; and
   generating a bitstream comprising information about the at least two split sections,
   wherein the determining the at least two split sections comprises, when a largest coding unit (LCU) includes the feature points of the at least two clusters, determining the LCU to be included in a specific split section from among the at least two split sections, the specific split section corresponding to a cluster having a highest number of feature points from among the at least two clusters, and
   wherein a size and a shape of each of the at least two split sections are individually determined.

2. The image encoding method of claim 1, wherein the feature point clustering is performed based on a distance between a center of a cluster and a feature point, and further based on a number of feature points included in the cluster, such that the extracted feature points are evenly distributed between the at least two clusters.

3. The image encoding method of claim 2, wherein the generating the at least two clusters comprises:
   calculating scores of the at least two clusters, based on the distance between the center of the cluster and the feature point, and further based on the number of feature points included in the cluster; and
   determining, from among the at least two clusters, the cluster including the feature point, wherein the cluster has a lowest calculated score among the scores of the at least two clusters.

4. The image encoding method of claim 3, the generating the at least two clusters further comprises:
   when a standard deviation of numbers of feature points of the at least two clusters is greater than a threshold value, recalculating the scores by increasing a weight of the numbers of the feature points; and
   determining, from among the at least two clusters, the cluster including the feature point, wherein the cluster has a lowest recalculated score among the recalculated scores.

5. The image encoding method of claim 1, wherein the determining the at least two split sections further comprises performing verification on a boundary between the at least two split sections.

6. The image encoding method of claim 5, wherein the performing the verification comprises:
   generating a feature point map with respect to the picture, based on a number of feature points comprised in the LCU; and
   determining whether a value of the feature point map with respect to the boundary is greater than a threshold value,
   wherein, when the value of the feature point map is not greater than the threshold value, the performing the verification further comprises re-determining, from among the at least two split sections forming the boundary, a split section to which the LCU belongs.

7. An image encoding apparatus comprising:
   a cluster generator configured to extract feature points from a picture, and generate at least two clusters by performing feature point clustering on the extracted feature points;
   a split section determiner configured to determine at least two split sections in the picture, the at least two split sections respectively corresponding to the at least two clusters, wherein each split section is configured of at least one block; and a bitstream generator configured to parallel-encode the at least two split sections, and generate a bitstream comprising information about the at least two split sections,
wherein the split section determiner is further configured to, when a largest coding unit (LCU) includes the feature points of the at least two clusters, determine the LCU to be included in a specific split section from among the at least two split sections, the specific split section corresponding to a cluster having a highest number of feature points from among the at least two clusters, and
wherein a size and a shape of each of the at least two split sections are individually determined.

8. The image encoding apparatus of claim 7, wherein the cluster generator is further configured to perform the feature point clustering based on a distance between a center of a cluster and a feature point, and further based on a number of feature points included in the cluster, such that the extracted feature points are evenly distributed between the at least two clusters.

9. The image encoding apparatus of claim 8, wherein the cluster generator is further configured to calculate scores of the at least two clusters, based on the distance between the center of the cluster and the feature point, and further based on the number of feature points included in the cluster, and determine, from among the at least two clusters, the cluster including the feature point, wherein the cluster has a lowest calculated score among the scores of the at least two clusters.

10. The image encoding apparatus of claim 9, wherein the cluster generator is further configured to, when a standard deviation of numbers of feature points of the at least two clusters is greater than a threshold value, recalculate the scores by increasing a weight of the numbers of the feature points, and determine, from among the at least two clusters, the cluster including the feature point, wherein the cluster has a lowest recalculated score among the recalculated scores.

11. The image encoding apparatus of claim 7, further comprising a verifier configured to perform verification on a boundary between the at least two split sections.

12. The image encoding apparatus of claim 11, wherein the verifier is further configured to generate a feature point map with respect to the picture, based on a number of feature points comprised in the LCU, determine whether a value of the feature point map with respect to the boundary is greater than a threshold value, and determine, from among the at least two split sections forming the boundary, a split section to which the LCU belongs when the value of the feature point map is not greater than the threshold value.

13. An image decoding method comprising:
receiving a bitstream comprising split section information;
determining at least two split sections based on the split section information, wherein each split section is configured of at least one block; and
reconstructing an image by performing parallel-decoding on the at least two split sections.

14. An image decoding apparatus comprising:
a receiver configured to receive a bitstream comprising split section information;
a split section determiner configured to determine at least two split sections based on the split section information, wherein each split section is configured of at least one block; and
a decoder configured to reconstruct an image by performing parallel-decoding on the at least two split sections.

15. A non-transitory computer-readable recording medium having recorded thereon instructions for implementing the image encoding method of claim 1.

16. The image encoding method of claim 1, wherein the feature points are pixels that are determined to correspond to predetermined features in the picture.

17. The image encoding method of claim 16, wherein the predetermined features comprise at least one of an edge, a corner, and a point of interest.

* * * * *